United States Patent
Watanabe

(10) Patent No.: US 7,643,219 B2
(45) Date of Patent: Jan. 5, 2010

(54) ZOOM LENS AND IMAGE PICKUP APPARATUS EQUIPPED WITH SAME

(75) Inventor: Masahito Watanabe, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/313,869

(22) Filed: Nov. 24, 2008

(65) Prior Publication Data

US 2009/0168194 A1 Jul. 2, 2009

(30) Foreign Application Priority Data

Nov. 29, 2007 (JP) .............................. 2007-308989

(51) Int. Cl.
*G02B 15/14* (2006.01)

(52) U.S. Cl. ....................... 359/676; 359/687

(58) Field of Classification Search ................. 359/676, 359/686, 687, 689, 690; 348/240.99–240.3, 348/335–369; 396/72–88

See application file for complete search history.

(56) References Cited

U.S. PATENT DOCUMENTS

| | | | | |
|---|---|---|---|---|
| 6,052,235 A | * | 4/2000 | Ozaki | ........................ 359/686 |
| 7,151,638 B2 | | 12/2006 | Ohashi | |
| 2005/0190457 A1 | | 9/2005 | Ohashi | |

FOREIGN PATENT DOCUMENTS

| | | |
|---|---|---|
| JP | 2005-242116 | 9/2005 |
| JP | 2005-326743 | 11/2005 |
| JP | 2006-078979 | 3/2006 |

\* cited by examiner

*Primary Examiner*—Darryl J Collins
(74) *Attorney, Agent, or Firm*—Kenyon & Kenyon LLP

(57) ABSTRACT

A zoom lens has, in order from the object side thereof, a positive first lens unit G1, a negative second lens unit G2 and a rear group having a positive refracting power and composed of at least one lens unit. The lens unit located closest to the object side in the rear group is a third lens unit G3. An aperture stop S is provided at a position closer to the image side than the second lens unit G2 and closer to the object side than the lens surface located closest to the image side in the third lens unit.

11 Claims, 14 Drawing Sheets

ZOOM LENS AND IMAGE PICKUP APPARATUS EQUIPPED WITH SAME

CROSS-REFERENCE TO RELATED APPLICATION

The present application is based upon and claims the benefit of priority from the prior Japanese Patent Application No. 2007-308989 filed on Nov. 29, 2007; the entire contents of which are incorporated herein by reference.

BACKGROUND OF THE INVENTION

1. Field of the Invention

The present invention relates to a zoom lens and an image pickup apparatus equipped with the same.

2. Description of the Related Art

In recent years, digital cameras that pick up an image of an object using an image pickup element such as a CCD or CMOD sensor have replaced film cameras to become the mainstream.

Among such digital cameras, cameras of a type that is small in the dimension with respect to the thickness direction (i.e. direction along the optical axis) to facilitate portability have been favored.

On the other hand, although the zoom ratios of zoom lenses used in compact digital cameras are typically about three, zoom lenses having higher zoom ratios are demanded recently.

There is a known type of zoom lens that can easily achieve a high zoom ratio, that is, a zoom lens having three or more lens units including, in order from the object side thereof, a first lens unit having a positive refracting power, a second lens unit having a negative refracting power and a rear group having a positive refracting power, the lens unit located closest to the object side in the rear group being a third lens unit having a positive refracting power.

For example, Japanese Patent Application Laid-Open Nos. 2005-242116, 2005-326743 and 2006-78979 disclose zoom lenses having a zoom ratio of about 4.5.

In these zoom lenses, in order to facilitate magnification change provided by the second and the third lens units, the first lens unit and the third lens unit are moved in such a way as to be located closer to the object side at the telephoto end than at the wide angle end, and the second lens unit is fixed or moved in such a way as to be located closer to the image side at the telephoto end than at the wide angle end.

SUMMARY OF THE INVENTION

According to an aspect of the present invention, there is provided a zoom lens comprising, in order from the object side thereof:

a first lens unit having a positive refracting power;

a second lens unit having a negative refracting power; and a rear group having a positive refracting power that comprises at least one lens unit, the lens unit located closest to the object side in the rear group being a third lens unit having a positive refracting power, wherein the zoom lens comprises an aperture stop disposed closer to the image side than the second lens unit and closer to the object side than the lens surface closest to the image side in the third lens unit, wherein during zooming from the wide angle end to the telephoto end in the state in which the zoom lens is focused on an object at the farthest distance, the distance between the first lens unit and the second lens unit is larger at the telephoto end than at the wide angle end, the distance between the second lens unit and the third lens unit is smaller at the telephoto end than at the wide angle end, the first lens unit is located closer to the object side at the telephoto end than at the wide angle end, the second lens unit starts to move toward the object side at an intermediate point in zooming from the wide angle end to the telephoto end and thereafter reverses its moving direction to move toward the image side, the aperture stop is located closer to the object side at the telephoto end than at the wide angle end, the third lens unit is located closer to the object side at the telephoto end than at the wide angle end, and the zoom lens satisfies the following conditions:

$$1.0 \leq S2_w/S2_{m1} < 1.1$$

$$0.5 < S2_t/S2_{m2} < 0.99$$

$$1.0 < S1_t/f_t < 1.4$$

where, $f_t$ is the focal length of the entire zoom lens system at the telephoto end, $S1_t$ is the actual distance on the optical axis from a lens surface located closest to the object side in the first lens unit to an image plane at the telephoto end, $S2_w$ is the actual distance on the optical axis from the lens surface located closest to the object side in the second lens unit to the image plane at the wide angle end, $S2_t$ is the actual distance on the optical axis from the lens surface located closest to the object side in the second lens unit to the image plane at the telephoto end, $S2_{m1}$ is the actual distance on the optical axis from the lens surface located closest to the object side in the second lens unit to the image plane at a first intermediate zoom position, which is defined as a zoom position at which the second lens unit starts to move toward the object side, and $S2_{m2}$ is the actual distance on the optical axis from the lens surface located closest to the object side in the second lens unit to the image plane at the second intermediate zoom position, which is defined as a zoom position at which the second lens unit reverses its moving direction from movement toward the object side to movement toward the image side.

According to another aspect of the present invention, there is provided an image pickup apparatus comprising a zoom lens as described above, and an image pickup element disposed on the image side of the zoom lens that converts an image formed by the zoom lens into an electrical signal.

BRIEF DESCRIPTION OF THE DRAWINGS

FIG. 4A shows aberrations at the wide angle end, FIG. 4B shows aberrations at an intermediate zoom position and FIG. 4C shows aberrations at the telephoto end;

DETAILED DESCRIPTION OF THE INVENTION

Figure 1A:
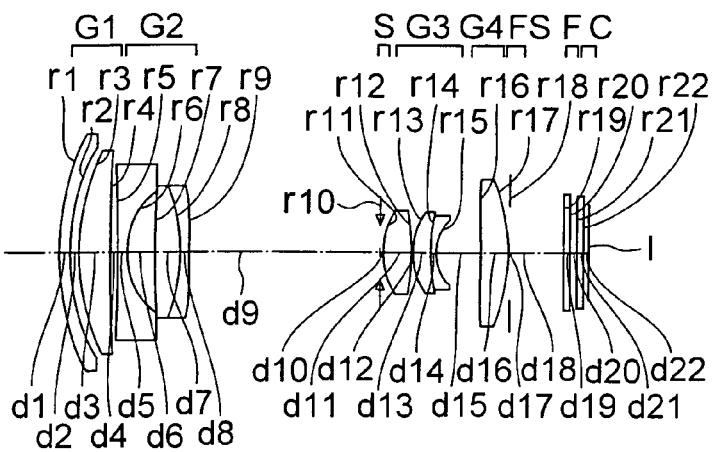
FIGS. 1A to 1E are cross sectional views of a zoom lens according to a first embodiment of the present invention in the state in which the zoom lens is focused on a object point at infinity respectively at the wide angle end (FIG. 1A), at a first intermediate zoom position (FIG. 1B), at an intermediate focal length position (FIG. 1C), at a second intermediate zoom position (FIG. 1D) ant at the telephoto end (FIG. 1E)

The zoom lens according to the present invention is composed, in order from the object side thereof, of:

a first lens unit having a positive refracting power;

a second lens unit having a negative refracting power; and a rear group having a positive refracting power and composed of at least one lens unit, wherein the lens unit located closest to the object side in the rear group is a third lens unit having a positive refracting power, an aperture stop is provided on the image side of the second lens unit and on the object side of the lens surface closest to the image side in the third lens unit, and during zooming from the wide angle end to the telephoto end in a state in which the zoom lens is focused on an object at the farthest distance, the distance between the first lens unit and the second lens unit is larger at the telephoto end than at the wide angle end, the distance between the second lens unit and the third lens unit is smaller at the telephoto end than at the wide angle end, the first lens unit is located closer to the object side at the telephoto end than at the wide angle end, during zooming from the wide angle end to the telephoto end the second lens unit starts to move toward the object side at an intermediate point in zooming from the wide angle end to the telephoto end and thereafter reverses its moving direction to move toward the image side, the aperture stop is located closer to the object side at the telephoto end than at the wide angle end, and the third lens unit is located closer to the object side at the telephoto end than at the wide angle end.

Locating the first lens unit closer to the object side at the telephoto end than at the wide angle end is advantageous in achieving an adequate magnification changing function provided by changes in the distance between the first lens unit and the second lens unit.

The third lens unit is located closer to the object side at the telephoto end than at the wide angle end, whereby the third lens unit is also provided with a magnification changing function, which is advantageous in achieving a high zoom ratio.

In addition, during zooming from the wide angle end to the telephoto end, the second lens unit starts to move toward the object side at an intermediate point in zooming. In other words, in a zoom range near the wide angle end, the position of the second lens unit is fixed or the second lens unit moves toward the image side. This enables to enhance the magnification changing function while making the movement amount of the third lens unit small during zooming in the zoom range near the wide angle end.

Thereafter, the second lens unit is moved in the direction toward the object side. This facilitates reduction in the entire length the zoom lens in the in the zoom range near the wide angle end and reduction in the size of the zoom lens with respect to the diametrical direction. Thereafter, the second lens unit is moved in the direction toward the image side. Thus, it is possible to achieve an adequately high zoom ratio by the movement of the second lens unit while suppressing an increase in the entire length of the zoom lens in the zoom range near the telephoto end.

As per the above, it is possible to reduce the size of the zoom lens with respect to the diametrical direction while making changes in the entire length of the zoom lens small. This is advantageous in achieving a high zoom ratio.

To facilitate reduction in aberration variations during zooming while achieving the above described functions, it is preferred that the following features be adopted.

Here, a first intermediate zoom position is defined as the zoom position (or zoom state) at which the second lens unit starts to move toward the object side, and a second intermediate zoom position is defined as the zoom position (or zoom state) at which the direction of movement of the second lens unit toward the object side is reversed toward the image side.

It is preferred that the following conditional expressions be satisfied:

$$1.0 \leq S2_w/S2_{m1} < 1.1 \quad (1)$$

$$0.5 < S2_t/S2_{m2} < 0.99 \quad (2)$$

$$1.0 < S1_t/f_t < 1.4 \quad (3)$$

where, $f_t$ is the focal length of the entire zoom lens system at the telephoto end, $S1_t$ is the actual distance on the optical axis from the lens surface located closest to the object side in the first lens unit to the image plane at the telephoto end, $S2_w$ is the actual distance on the optical axis from the lens surface located closest to the object side in the second lens unit to the image plane at the wide angle end, $S2_t$ is the actual distance on the optical axis from the lens surface located closest to the object side in the second lens unit to the image plane at the telephoto end, $S2_{m1}$ is the actual distance on the optical axis from the lens surface located closest to the object side in the second lens unit to the image plane at the first intermediate zoom position, and $S2_{m2}$ is the actual distance on the optical axis from the lens surface located closest to the object side in the second lens unit to the image plane at the second intermediate zoom position.

The conditional expression (1) specifies preferred relationship between the position of the second lens unit at the wide angle end and the position of the second lens unit at the first intermediate zoom position.

The lower limit of conditional expression (1) cannot be exceeded. Thus, it is easy to provide an adequate magnification change by movement of the third lens unit in zooming in the range near the wide angle end.

By restricting the movement of the second lens unit toward the image side appropriately so that the upper limit of conditional expression (1) is not exceeded, the first lens unit and the second lens unit can be made compact at zoom positions near the wide angle end.

Conditional expression (2) specifies preferred relationship between the position of the second lens unit at the second intermediate zoom position and the position of the second lens unit at the telephoto end.

By appropriately restricting the movement amount of the second lens unit in zooming in the range near the telephoto end so that the lower limit of conditional expression (2) is not exceeded, the magnification change provided by the second lens unit can be reduced.

By designing the zoom lens in such a way that the upper limit of conditional expression (2) is not exceeded, the movement amount of the second lens unit in zooming in the range near the telephoto end becomes adequately large, which facilitates reduction in the entire length of the zoom lens near the telephoto end.

Conditional expression (3) specifies preferred telephoto ratios at the telephoto end.

By designing the zoom lens in such a way that the lower limit of conditional expression (3) is not exceeded, the refracting power of each lens unit can be prevented from becoming unduly large, which is advantageous in reducing various aberrations.

By designing the zoom lens in such a way that the upper limit of conditional expression (3) is not exceeded, the entire length of the zoom lens at the telephoto end can be made relatively small. Thus, the size of the lens frame with respect to the thickness direction (i.e. the direction along the optical axis) can advantageously be made small.

Movements of the lens units that satisfy the above conditional expressions (1), (2) and (3) facilitate reduction of variations in curvature of field and coma associated with small zoom lenses having high zoom ratios.

Furthermore, in the above described zoom lens according to the present invention, it is preferred that at least one of the following features be adopted.

It is preferred that during zooming from the wide angle end to the telephoto end, the second lens unit moves first toward the image side. This makes it easier to reduce the movement of the third lens unit in zooming in the zoom range near the wide angle end, which is advantageous in achieving an adequate zoom ratio in the zoom range near the wide angle end.

It is also preferred that the zoom lens satisfy the following conditional expression:

$$8.0 < f_t/f_w < 25.0 \quad (4)$$

where ft is the focal length of the entire zoom lens system at the telephoto end, and fw is the focal length of the entire zoom lens system at the wide angle end.

Conditional expression (4) specifies preferred zoom ratios.

By achieving an adequately high zoom ratio not lower than the lower limit of conditional expression (4), advantages of size reduction and high zoom ratio provided by the present invention can be enjoyed.

By making the zoom ratio not to be higher than the upper limit of conditional expression (4), the refractive powers of the respective lens units are prevented from becoming unduly large, and each lens unit is not required to have a large thickness for aberration correction. This is advantageous in reducing the size of the zoom lens at the time when the lens barrel is collapsed.

It is also preferred that during zooming from the wide angle end to the telephoto end, the first lens unit move first toward the object side. By this feature, the magnification change that the third lens unit is required to provide can be made smaller.

It is also preferred that the first lens unit move in such a way that the following conditional expression is satisfied.

$$0.5 < (S1_{m2} - S1_w)/(S1_t - S1_w) < 1.02 \quad (5)$$

where $S1_w$ is the actual distance on the optical axis from the lens surface located closest to the object side in the first lens unit to the image plane at the wide angle end, $S1_{m2}$ is the actual distance on the optical axis from the lens surface located closest to the object side in the first lens unit to the image plane at the second intermediate zoom position, and $S1_t$ is the actual distance on the optical axis from the lens surface located closest to the object side in the first lens unit to the image plane at the telephoto end.

Conditional expression (5) specifies preferred relationship between the movement amount of the first lens unit during zooming from the wide angle end to the second intermediate zoom position and that during zooming from the wide angle end to the telephoto end.

By designing the zoom lens in such a way that the lower limit of conditional expression (5) is not exceeded, the first lens unit is prevented from coming unduly close to the image side at zoom positions near the second intermediate zoom position, and the magnification change that the third lens unit is required to provide at zoom positions near the telephoto end can be reduced, which facilitates reduction in the movement amount of the third lens unit.

By designing the zoom lens in such a way that the upper limit of conditional expression (5) is not exceeded, the first lens unit is prevented from coming unduly close to the image side at the telephoto end, and the magnification change that the second lens unit is required to provide at zoom positions near the telephoto end can be reduced. This is advantageous in achieving an adequately high zoom ratio while keeping the entire length of the zoom lens small.

It is also preferred that the second lens unit move in such a way that the following conditional expressions are satisfied.

$$1.02 < f_{m1}/f_w < 2.0 \quad (6)$$

$$3.0 < f_{m2}/f_w < 9.0 \quad (7)$$

where $f_{m1}$ is the focal length of the entire zoom lens system at the first intermediate zoom position, $f_{m2}$ is the focal length of the entire zoom lens system at the second intermediate zoom position, and $f_w$ is the focal length of the entire zoom lens system at the wide angle end.

Conditional expression (6) specifies preferred magnification conditions at the first intermediate zoom position.

By designing the zoom lens in such a way that the lower limit of conditional expression (6) is not exceeded, the movement amount of the third lens unit in the zoom range near the wide angle end can readily be made small, which is advantageous in making the zoom ratio higher.

By designing the zoom lens in such a way that the upper limit of conditional expression (6) is not exceeded, the size of the first and second lens units with respect to the diametrical direction at the wide angle end can readily be made small.

Conditional expression (7) specifies preferred magnification conditions at the second intermediate zoom position.

Designing the zoom lens in such a way that the lower limit of conditional expression (7) is not exceeded is advantageous in achieving an adequately high zoom ratio.

Designing the zoom lens in such a way that the upper limit of conditional expression (7) is not exceeded is advantageous in reducing the entire length of the zoom lens.

It is also preferred that the rear group include a fourth lens unit having a positive refracting power disposed on the image side of the third lens unit, the fourth lens unit move during zooming from the wide angle end to the telephoto end in such a way that the distance of the fourth lens unit and the third lens unit changes, and the fourth lens unit be located closer to the image side at the telephoto end than at the wide angle end. By this feature, the fourth lens unit can also provide a magnifying function. Thus, the movement amounts of the first, second and third lens units can be reduced, which provides further advantages in reducing the size of the zoom lens at the time when the lens barrel is collapsed and in increasing the zoom ratio.

It is also preferred that the rear group include a fifth lens unit provided on the image side of the fourth lens unit that is fixed during zooming from the wide angle end to the telephoto end. This is advantageous in achieving correction of curvature of field.

Furthermore, it is more preferred that the fifth lens unit be composed of a single aspheric lens having an aspheric surface. This is advantageous in reducing the thickness (i.e. the length along the optical axis) of the zoom lens at the time when the zoom barrel is collapsed and in achieving correction of off-axis aberrations.

An image pickup apparatus according to the present invention comprises at least any one of the above described zoom lenses and an image pickup element disposed on the image side of the zoom lens that converts an image formed by the zoom lens into an electrical signal. Thus, an image pickup apparatus equipped with a small size zoom lens having a high zoom ratio can be provided.

Furthermore, it is preferred that the image pickup apparatus be provided with an image processing section that performs signal processing for correcting aberrations contained in the image represented by the electrical signal. This is advantageous in further reducing the size of the zoom lens, since aberrations of the zoom lens are allowed to be left.

In the case where the zoom lens has a focusing function, the conditional expressions presented above should be interpreted as conditions in the state in which the zoom lens is focused on an object point at the farthest distance.

Focusing operation from an object at a long distance to an object at a short distance may be performed by advancing the first lens unit, advancing the entire zoom lens or moving the second and/or third lens unit. To reduce the load on driving for focusing, it is preferred that a fourth lens unit having a positive refracting power or a fourth lens unit having a negative refracting power be provided, and the focusing be performed by moving this fourth lens unit.

It is more preferred that the limit values in the conditional expressions be changed as follows.

As to conditional expression (1), it is more preferred that the lower limit value be 1.01. This makes it easier to provide an adequate magnification change by movement of the third lens unit in zooming in the zoom range near the wide angle end. It is more preferred that the upper limit value be 1.07.

As to conditional expression (2), it is more preferred that the lower limit value be 0.7. It is more preferred that the upper limit value be 0.96.

As to conditional expression (3), it is more preferred that the lower limit value be 1.05. It is more preferred that the upper limit value be 1.35.

As to conditional expression (4), it is more preferred that the lower limit value be 9.

As to conditional expression (5), it is more preferred that the lower limit value be 0.6. It is more preferred that the upper limit value be 1.0.

As to conditional expression (6), it is more preferred that the lower limit value be 1.05. It is more preferred that the upper limit value be 1.6.

As to conditional expression (7), it is more preferred that the lower limit value be 5.0. It is more preferred that the upper limit value be 7.0.

In the above-described modes of the invention, it is more preferred that some of the conditions, which may be selected arbitrarily, be satisfied at the same time. In the more preferred numerical range limitations by each of the conditional expressions presented just above, limitation by only the upper limit value or the lower limit value may be applied. Furthermore, the various features described above may be adopted in any possible combination.

According to the invention, there can be provided a zoom lens that can be readily made small with respect to the diametrical direction and is advantageous in achieving a high zoom ratio. In addition, variations in aberrations associated with an increase in the zoom ratio can be easily prevented. There can also be provided an image pickup apparatus equipped with such a zoom lens.

In the following, embodiments of the zoom lens and the image pickup apparatus according to the present invention will be described in detail with reference to the drawings. It should be understood, however, that the present invention is not limited by the embodiments. The zoom lens according to each embodiment has a high zoom ratio, a small diametrical dimension and good optical performance.

Figure 1B:
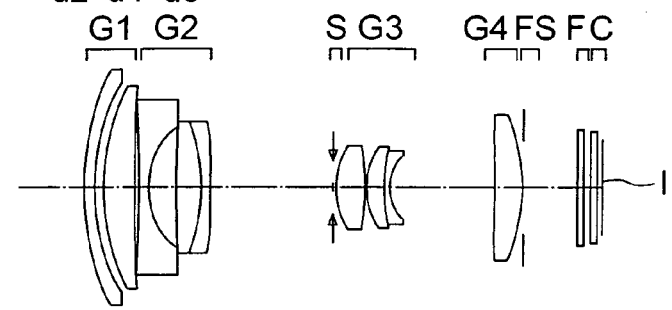
Figure 1C:
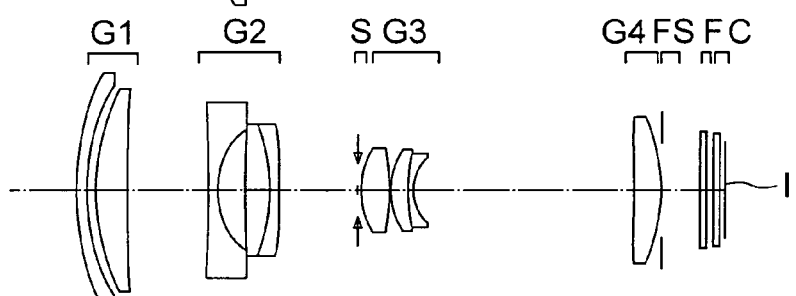
Figure 1D:
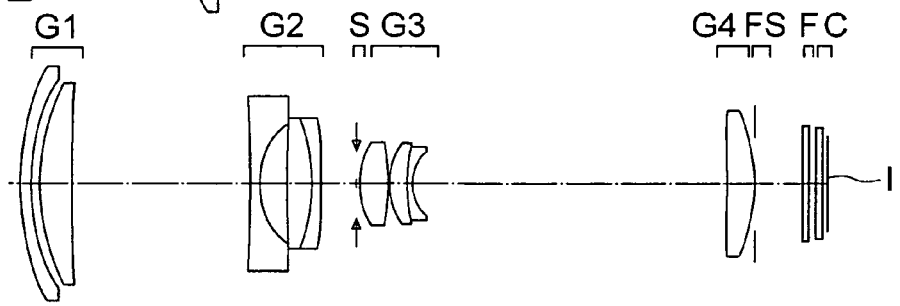
Figure 1E:
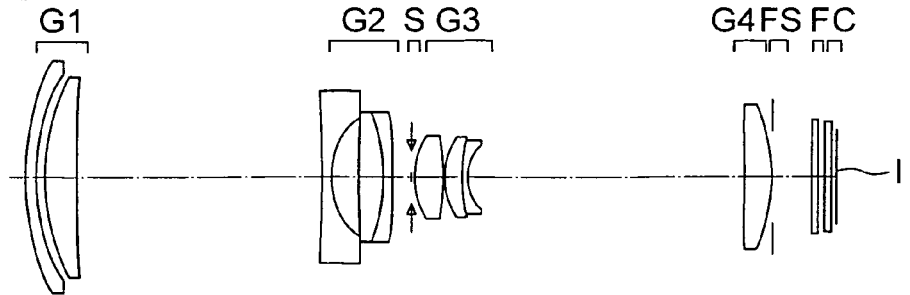
Figure 2A:
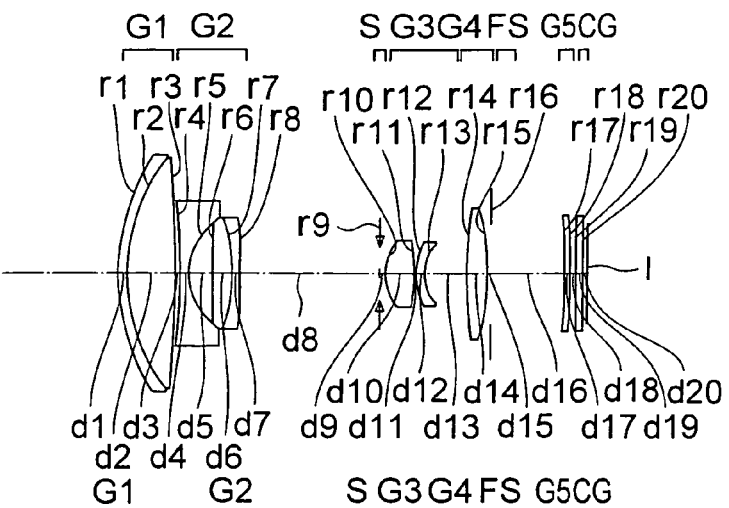
FIGS. 2A to 2E are cross sectional views similar to FIGS. 1A to 1E showing a zoom lens according to a second embodiment of the present invention.
Figure 2B:
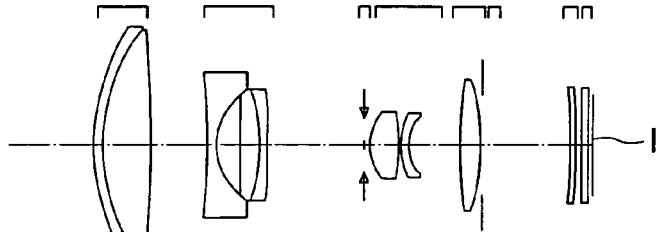
Figure 2C:
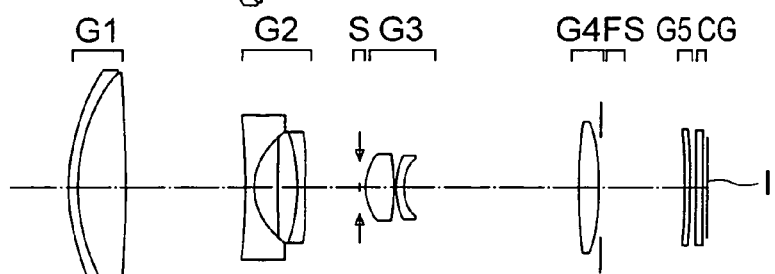
Figure 2D:
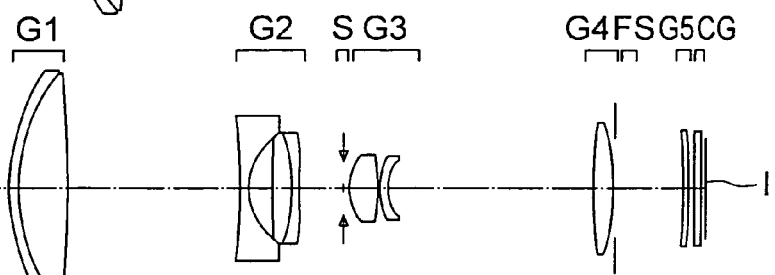
Figure 2E:
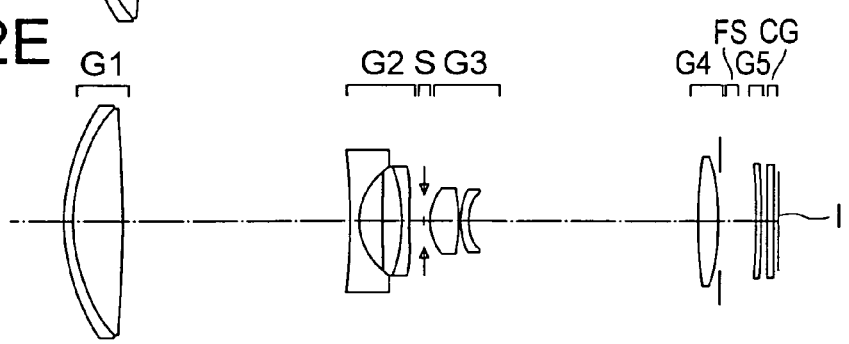
Figure 3A:
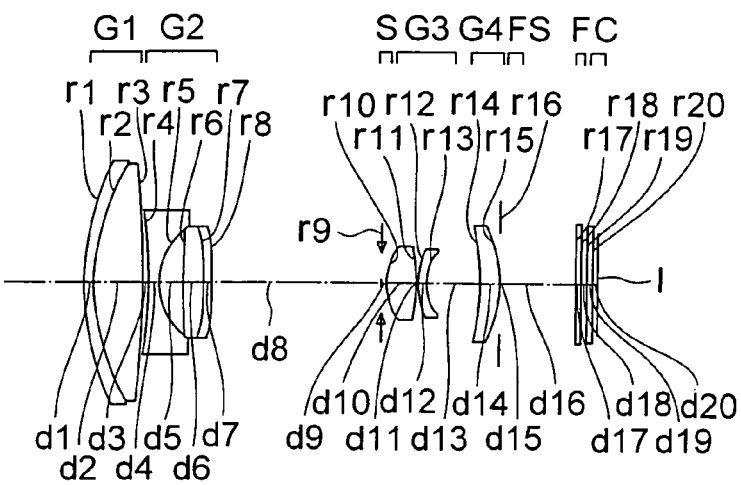
FIGS. 3A to 3E are cross sectional views similar to FIGS. 1A to 1E showing a zoom lens according to a third embodiment of the present invention.
Figure 3B:
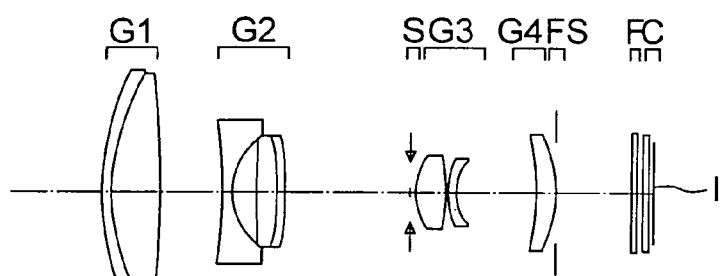
Figure 3C:
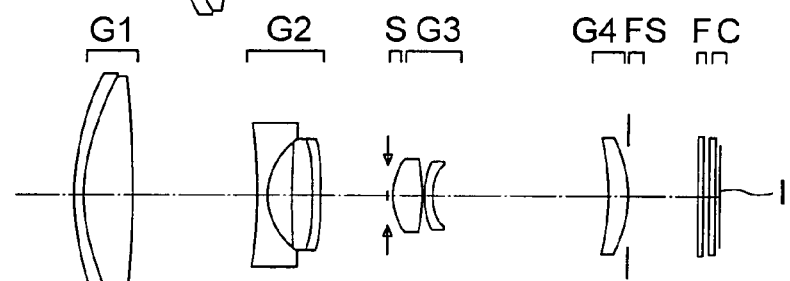
Figure 3D:
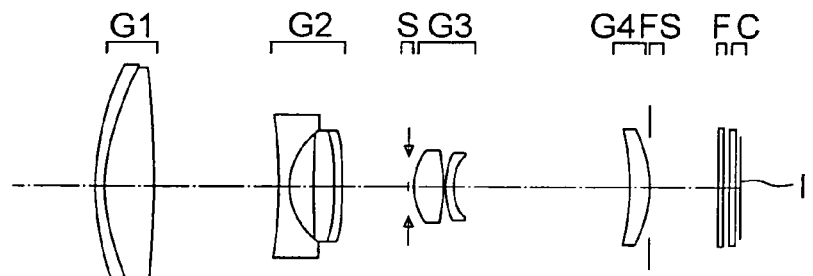
Figure 3E:
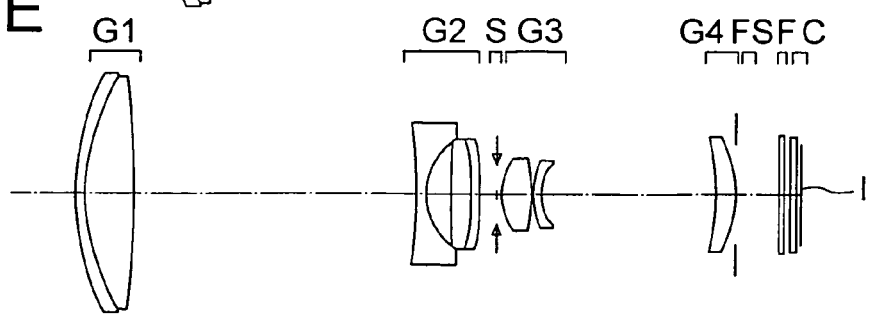

In the following, first to third embodiments of the zoom lens according to the present invention will be described. FIGS. 1A to 1E, 2A to 2E and 3A to 3E are cross sectional views of the zoom lenses according to the first to third embodiments respectively in the state in which the zoom lenses are focused on an object point at infinity. FIGS. 1A, 2A and 3A show the states of the respective zoom lenses at the wide angle end, FIGS. 1B, 2B and 3B show the states at the first intermediate zoom position, FIGS. 1C, 2C and 3C show the states at an intermediate focal length position, FIGS. 1D, 2D and 3D show the states at the second intermediate zoom position, and FIGS. 1E, 2E and 3E show the states at the telephoto end. In FIGS. 1A to 1E, 2A to 2E and 3A to 3E, the first lens unit is denoted by G1, the second lens unit is denoted by G2, an aperture stop is denoted by S, the third lens unit is denoted by G3, the fourth lens unit is denoted by G4, the fifth lens unit is denoted by G5, a plane parallel plate having wavelength range restriction coating applied thereon that blocks or reduces infrared light to constitute a low pass filter is denoted by F, a plane parallel plate constituting a cover glass for an electronic image pickup element is denoted by C, and the image plane is denoted by I. The cover glass C may have multi-layer coating for wavelength range restriction applied on its surface. The cover glass C may be designed to have a function of a low pass filter.

Numerical data presented later and the cross sectional views of the zoom lenses of the respective embodiments are for the states at the wide angle end, at the first intermediate zoom position, at the intermediate focal length position, at the second intermediate zoom position and at the telephoto end of the zoom range. In the first and second embodiments, the focal lengths corresponding to the above mentioned positions increase in the mentioned order, while in the third embodiment, the intermediate focal length position and the second intermediate zoom position coincide with each other.

Aberration diagrams that will be mentioned later are presented for three states, namely the states at the wide angle end, at the intermediate focal length position and at the telephoto end.

In the zoom lenses according to the first to third embodiments described below, the effective image pickup area has a constant rectangular shape at all the zoom positions. All the numerical values associated with conditional expressions presented below for each embodiment are for the state in which the zoom lens is focused on an object at infinity. The value obtained by adding the back focus to the distance from the incidence surface to the exit surface of the lens, and the back focus represented by an equivalent air distance will also be presented in the following tables. In addition, data representing the positions of the respective lens units will be presented for sixteen focal length states (or zoom positions) among the focal length states that occur during zooming from the wide angle end to the telephoto end in order from the shorter focal length to the longer focal length. Diagrams that illustrate loci of movement of the respective lens units will also be presented.

Focusing operation is performed by moving the fourth lens unit. Specifically, focusing operation from an object point at a long distance to an object point at a short distance is performed by moving the fourth lens unit toward the object side. Plane parallel plates include a low pass filter having IR cut coating applied thereon and a CCD cover glass. In the case where there is only one plane parallel plate, IR cut coating is applied on the CCD cover glass, and no low pass filter is used.

In each embodiment, the aperture stop S moves integrally with the third lens unit. All the numerical data presented below are for the state in which the zoom lens is focused on an object at infinity. In the numerical data, dimensions are in mm and angles are in degrees. As described above, the zoom data will be presented for the wide angle end (WE), the first intermediate zoom position (ST1), the intermediate focal length state (ST2), the second intermediate zoom position (ST3) and the telephoto end (TE).

As shown in FIGS. 1A to 1E, the zoom lens according to the first embodiment has a first lens unit G1 having a positive refracting power, a second lens unit having a negative refracting power, an aperture stop S, a third lens unit G3 having a positive refracting power and a fourth lens unit G4 having a positive refracting power, which are arranged in the mentioned order from the object side. The third lens unit G3 and the fourth lens unit G4 constitute a rear group.

Figure 7:
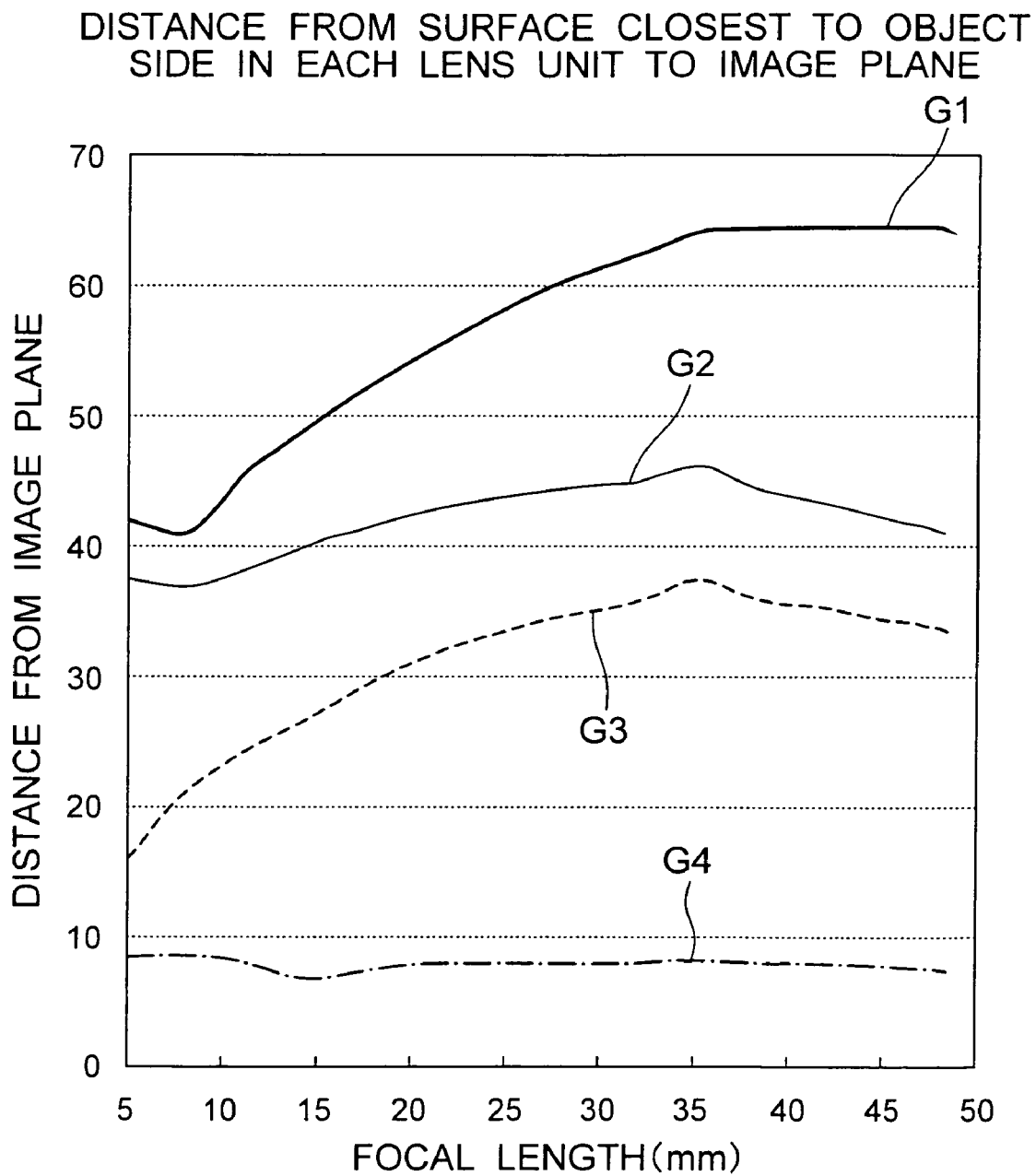
FIG. 7 is a diagram showing movements of the lens units in the first embodiment.

FIG. 7 illustrates how the lens units move during zooming from the wide angle end to the telephoto end. During zooming from the wide angle end to the telephoto end, the distance between the first lens unit G1 and the second lens unit G2 is larger at the telephoto end than at the wide angle end, and the distance between the second lens unit G2 and the third lens unit G3 is smaller at the telephoto end than at the wide angle end.

The first lens unit G1 is located closer to the object side at the telephoto end than at the wide angle end.

During zooming from the wide angle end to the telephoto end, the second lens unit G2 starts to move toward the object side at an intermediate point in zooming from the wide angle end to the telephoto end, and thereafter reverses its moving direction to move toward the image side.

The aperture stop S is located closer to the object side at the telephoto end than at the wide angle end.

The third lens unit G3 is located closer to the object side at the telephoto end than at the wide angle end. The fourth lens unit G4 is located closer to the image side at the telephoto end than at the wide angle end.

The first lens unit G1 is composed, in order from the object side, of a negative meniscus lens having a convex surface directed toward the object side and a positive meniscus lens having a convex surface directed toward the object side. The second lens unit G2 is composed, in order from the object side, of a biconcave negative lens, and a cemented lens composed of a biconvex positive lens and a biconcave negative lens. The third lens unit G3 is composed, in order from the object side, of a biconvex positive lens, and a cemented lens composed of a positive meniscus lens having a convex surface directed toward the object side and a negative meniscus lens having a convex surface directed toward the object side. The fourth lens unit G4 is composed of a biconvex positive lens.

Aspheric surfaces are used in both surfaces of the biconcave negative lens in the second lens unit G2, the image side surface of the biconcave negative lens located closest to the image side in the second lens unit G2, both surfaces of the biconvex positive lens in the third lens unit G3, and the image side surface of the biconvex positive lens in the fourth lens unit G4, namely there are six aspheric surfaces.

As shown in FIGS. 2A to 2E, the zoom lens according to the second embodiment has a first lens unit G1 having a positive refracting power, a second lens unit having a negative refracting power, an aperture stop S, a third lens unit G3 having a positive refracting power, a fourth lens unit G4 having a positive refracting power, a flare stop FS and a fifth lens unit G5, which are arranged in the mentioned order from the object side. The third lens unit G3, the fourth lens unit G4 and the fifth lens unit G5 constitute a rear group.

Figure 8:
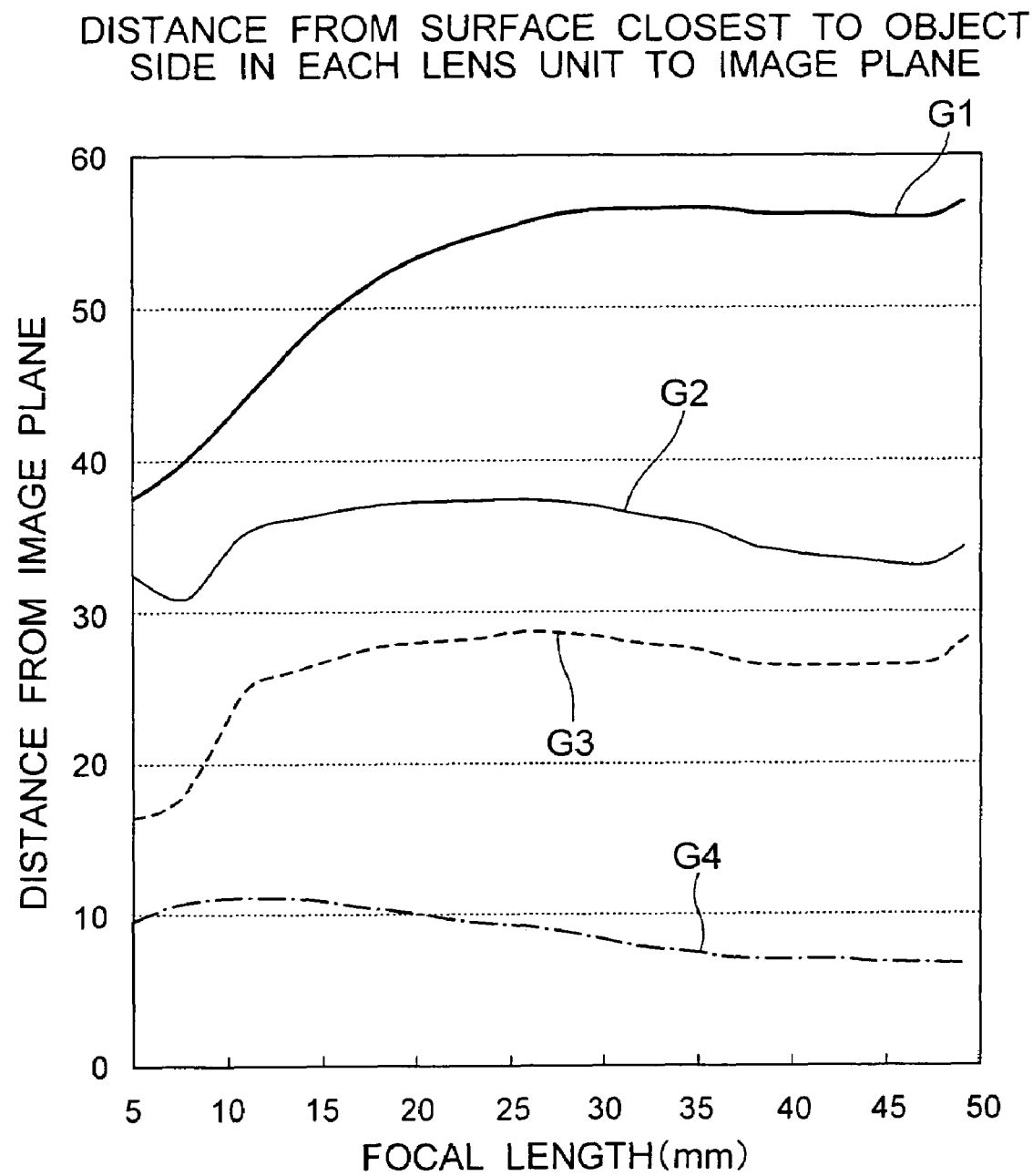
FIG. 8 is a diagram showing movements of the lens units in the second embodiment.

FIG. 8 illustrates how the lens units move during zooming from the wide angle end to the telephoto end. During zooming from the wide angle end to the telephoto end, the distance between the first lens unit G1 and the second lens unit G2 is larger at the telephoto end than at the wide angle end, and the distance between the second lens unit G2 and the third lens unit G3 is smaller at the telephoto end than at the wide angle end.

The first lens unit G1 is located closer to the object side at the telephoto end than at the wide angle end.

During zooming from the wide angle end to the telephoto end, the second lens unit G2 starts to move toward the object side at an intermediate point in zooming from the wide angle end to the telephoto end, and thereafter reverses its moving direction to move toward the image side.

The aperture stop S is located closer to the object side at the telephoto end than at the wide angle end.

The third lens unit G3 is located closer to the object side at the telephoto end than at the wide angle end. The fourth lens unit G4 is located closer to the image side at the telephoto end than at the wide angle end. The fifth lens unit G5 is fixed.

The first lens unit G1 is composed of a cemented lens composed, in order from the object side, of a negative meniscus lens having a convex surface directed toward the object side and a biconvex positive lens. The second lens unit G2 is composed, in order from the object side, of a biconcave negative lens, and a cemented lens composed of a biconvex positive lens and a biconcave negative lens. The third lens unit G3 is composed, in order from the object side, of a biconvex positive lens and a negative meniscus lens having a convex surface directed toward the object side. The fourth lens unit G4 is composed of a biconvex positive lens. The fifth lens unit G5 is composed of a negative meniscus lens having a convex surface directed toward the image side.

Aspheric surfaces are used in the image side surface of a biconvex positive lens in the first lens unit G1, both surfaces of the biconcave negative lens in the second lens unit G2, the image side surface of the biconcave negative lens located closest to the image side in the second lens unit G2, both surfaces of the biconvex positive lens in the third lens unit G3, the image side surface of a negative meniscus lens having a convex surface directed toward the object side in the third lens unit G3, and the object side surface of the negative meniscus lens having a convex surface directed toward the image side in the fifth lens unit G5, namely there are eight aspheric surfaces.

As shown in FIGS. 3A to 3E, the zoom lens according to the third embodiment has a first lens unit G1 having a positive refracting power, a second lens unit having a negative refracting power, an aperture stop S, a third lens unit G3 having a positive refracting power, a fourth lens unit G4 having a positive refracting power and a flare stop FS, which are arranged in the mentioned order from the object side. The third lens unit G3 and the fourth lens unit G4 constitute a rear group.

Figure 9:
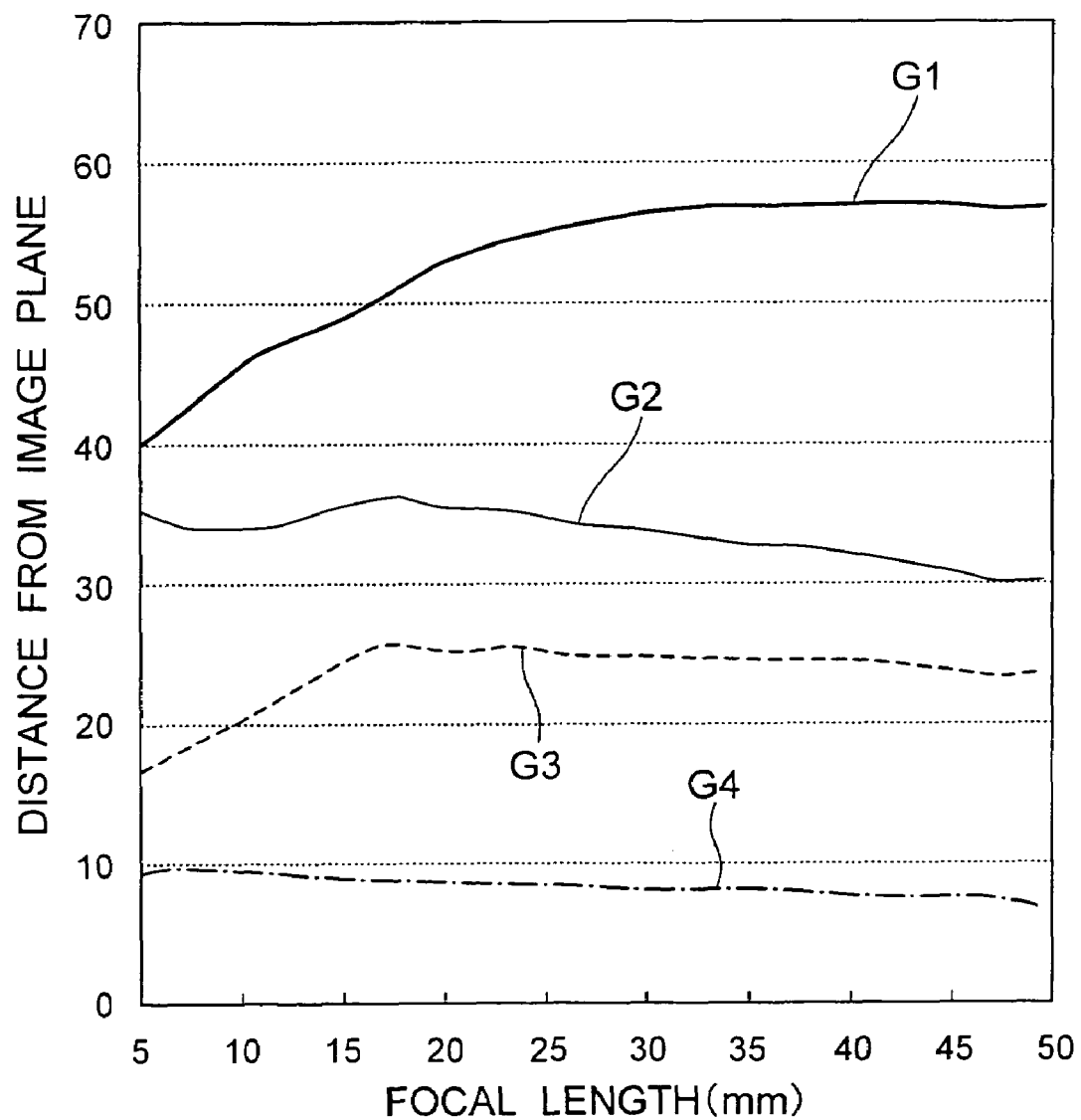
FIG. 9 is a diagram showing movements of the lens units in the third embodiment.

FIG. 9 illustrates how the lens units move during zooming from the wide angle end to the telephoto end. During zooming from the wide angle end to the telephoto end, the distance between the first lens unit G1 and the second lens unit G2 is larger at the telephoto end than at the wide angle end, and the distance between the second lens unit G2 and the third lens unit G3 is smaller at the telephoto end than at the wide angle end.

The first lens unit G1 is located closer to the object side at the telephoto end than at the wide angle end.

During zooming from the wide angle end to the telephoto end, the second lens unit G2 starts to move toward the object side at an intermediate point in zooming from the wide angle end to the telephoto end, and thereafter reverses its moving direction to move toward the image side.

The aperture stop S is located closer to the object side at the telephoto end than at the wide angle end.

The third lens unit G3 is located closer to the object side at the telephoto end than at the wide angle end. The fourth lens unit G4 is located closer to the image side at the telephoto end than at the wide angle end.

The first lens unit G1 is composed of a cemented lens composed, in order from the object side, of a negative meniscus lens having a convex surface directed toward the object side and a biconvex positive lens. The second lens unit G2 is composed, in order from the object side, of a biconcave negative lens, and a cemented lens composed of a biconvex positive lens and a biconcave negative lens. The third lens unit G3 is composed, in order from the object side, of a biconvex positive lens and a negative meniscus lens having a convex surface directed toward the object side. The fourth lens unit G4 is composed of a positive meniscus lens having a convex surface directed toward the image side.

Aspheric surfaces are used in the image side surface of a biconvex positive lens in the first lens unit G1, both surfaces of the biconcave negative lens in the second lens unit G2, the image side surface of the biconcave negative lens located closest to the image side in the second lens unit G2, both surfaces of the biconvex positive lens in the third lens unit G3, the image side surface of a negative meniscus lens having a convex surface directed toward the object side in the third lens unit, and the image side surface of the positive meniscus lens having a convex surface directed toward the image side in the fourth lens unit G4, namely there are eight aspheric surfaces.

When the zoom lens according to each embodiment is used, distortion may be corrected electrically.

In the zoom lenses according to the embodiments, barrel distortion appears on the rectangular photoelectric conversion surface, at the wide angle end. Whereas, the characteristic of distortion changes at the telephoto end and zoom positions near the intermediate focal length position.

To correct the distortion electrically, the effective image pickup area may be varied. For example, the effective image pickup area may be designed to have a barrel shape at the wide angle end and a rectangular shape at the intermediate focal length positions and at the telephoto end.

In addition, the effective image pickup area, which has been set in advance, is transformed into rectangular image information with reduced distortion by image transformation using image processing.

The maximum image height $IH_w$ at the wide angle end is designed to be smaller than the maximum image height $IH_s$ at the intermediate focal length position and the maximum image height $IH_t$ at the telephoto end.

For example, the effective image pickup area may be designed in such a way that the effective image pickup area at the wide angle end has a dimension in the shorter side direction equal to the dimension in the shorter side direction of the photoelectric conversion surface, and a distortion of approximately −3% remains after image processing. As a matter of course, a barrel shaped area smaller than that described above may be set as the effective image pickup area, and image resulting from transformation of this area into a rectangular area may be recorded/reproduced.

Numerical data of each embodiment described above is shown below. Apart from symbols described above, f denotes a focal length of the entire zoom lens system, $F_{NO}$ denotes an F number, ω denotes a half image angle, WE denotes a wide angle end, ST denotes an intermediate state, TE denotes a telephoto end, each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe's number for each lens.

The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

When x is let to be an optical axis with a direction of traveling of light as a positive (direction), and y is let to be in a direction orthogonal to the optical axis, a shape of the aspheric surface is described by the following expression.

$$x=(y^2/r)/[1+\{1-(K+1)(y/r)^2\}^{1/2}]+A_4y^4+A_6y^6+A_8y^8+A_{10}y^{10}+A_{12}y^{12}$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

EXAMPLE 1

Unit mm

Surface data

| Surface no. | r | d | nd | vd |
|---|---|---|---|---|
| 1 | 21.641 | 0.80 | 1.92286 | 18.90 |
| 2 | 16.511 | 0.71 | | |
| 3 | 17.370 | 2.50 | 1.77250 | 49.60 |
| 4 | 112.371 | Variable | | |
| 5* | −79.898 | 0.80 | 1.88300 | 40.76 |
| 6* | 7.108 | 2.17 | | |
| 7 | 84.762 | 1.96 | 1.94595 | 17.98 |
| 8 | −15.078 | 0.70 | 1.88300 | 40.76 |

-continued

Unit mm

| | | | | |
|---|---|---|---|---|
| 9* | 97.091 | Variable | | |
| 10(S) | ∞ | 0.30 | | |
| 11* | 6.103 | 2.21 | 1.58313 | 59.38 |
| 12* | −20.000 | 0.10 | | |
| 13 | 5.254 | 1.45 | 1.77250 | 49.60 |
| 14 | 11.559 | 0.45 | 2.00068 | 25.47 |
| 15 | 3.571 | Variable | | |
| 16 | 242.641 | 2.32 | 1.74330 | 49.33 |
| 17* | −12.988 | 0.00 | | |
| 18(FS) | ∞ | Variable | | |
| 19 | ∞ | 0.40 | 1.54771 | 62.84 |
| 20 | ∞ | 0.50 | | |
| 21 | ∞ | 0.50 | 1.51633 | 64.14 |
| 22 | ∞ | 0.37 | | |
| Image plane(Light receiving surface) | ∞ | | | |

Aspherical surface data

5th surface k = 0.000, A4 = −3.49085e−04, A6 = 2.48124e−05, A8 = −5.03579e−07, A10 = 3.54445e−09

6th surface k = 0.000, A4 = −1.31642e−04, A6 = 1.82019e−05, A8 = 6.59813e−07, A10 = 7.20635e−09

9th surface k = 0.000, A4 = −3.59447e−04, A6 = 3.22167e−06, A8 = −3.61826e−07, A10 = −5.40868e−10

11th surface k = 0.000, A4 = −4.78685e−04, A6 = 9.56255e−07, A8 = −1.07325e−06, A10 = −6.93724e−08

12th surface k = 0.000, A4 = 3.11129e−04, A6 = −4.51312e−06, A8 = −1.17499e−06, A10 = −3.41016e−08

17th surface k = 0.000, A4 = 4.00000e−05

Zoom data

| | WE | ST1 | ST2 | ST3 | TE |
|---|---|---|---|---|---|
| f(mm) | 5.04 | 7.97 | 16.99 | 35.01 | 48.30 |
| Fno. | 3.50 | 3.55 | 5.16 | 6.43 | 6.00 |
| 2ω(°) | 85.95 | 55.53 | 26.24 | 13.06 | 9.31 |
| d4 | 0.60 | 0.19 | 6.57 | 14.04 | 19.35 |
| d9 | 15.10 | 9.74 | 6.17 | 2.84 | 1.44 |
| d15 | 3.56 | 8.51 | 17.50 | 24.97 | 22.06 |
| d18 | 4.54 | 4.49 | 3.31 | 4.18 | 3.43 |

Distance from surface closest to the object, of each lens unit to image plane

| Focal length | G1 | G2 | G3 | G4 |
|---|---|---|---|---|
| 5.04 | 42.03 | 37.43 | 16.40 | 8.63 |
| 7.97 | 41.16 | 36.96 | 21.30 | 8.58 |
| 10.98 | 45.64 | 38.29 | 24.22 | 8.11 |
| 14.01 | 48.97 | 40.06 | 26.61 | 6.75 |
| 16.99 | 51.78 | 41.21 | 29.11 | 7.40 |
| 19.99 | 54.57 | 42.46 | 31.32 | 7.87 |
| 22.99 | 57.06 | 43.39 | 32.87 | 8.02 |
| 25.99 | 59.17 | 44.11 | 34.07 | 8.06 |
| 28.99 | 60.96 | 44.66 | 35.05 | 8.05 |
| 31.99 | 62.46 | 45.08 | 35.83 | 8.01 |
| 35.01 | 64.27 | 46.22 | 37.45 | 8.27 |
| 37.99 | 64.37 | 44.55 | 36.06 | 8.09 |
| 40.99 | 64.68 | 43.62 | 35.51 | 8.08 |
| 43.99 | 64.65 | 42.47 | 34.70 | 7.96 |
| 46.99 | 64.61 | 41.61 | 34.11 | 7.64 |
| 48.3 | 64.52 | 41.17 | 33.80 | 7.52 |

EXAMPLE 2

Unit mm

Surface data

| Surface no. | r | d | nd | vd |
|---|---|---|---|---|
| 1 | 17.384 | 0.80 | 1.94595 | 17.98 |
| 2 | 15.200 | 3.85 | 1.49700 | 81.54 |
| 3* | −87.716 | Variable | | |
| 4* | −23.736 | 0.80 | 1.83481 | 42.71 |
| 5* | 5.792 | 1.77 | | |
| 6 | 68.588 | 1.60 | 1.94595 | 17.98 |
| 7 | −14.185 | 0.60 | 1.77250 | 49.60 |
| 8* | 85.921 | Variable | | |
| 9(S) | ∞ | 0.30 | | |
| 10* | 4.180 | 2.35 | 1.49700 | 81.54 |
| 11* | −14.786 | 0.10 | | |
| 12 | 5.675 | 0.70 | 2.00170 | 20.64 |
| 13* | 3.607 | Variable | | |
| 14 | 37.999 | 1.60 | 1.74320 | 49.34 |
| 15 | −19.254 | 0.00 | | |
| 16(FS) | ∞ | Variable | | |
| 17* | −55.020 | 0.40 | 1.52542 | 55.78 |
| 18 | −59.976 | 0.50 | | |
| 19 | ∞ | 0.50 | 1.51633 | 64.14 |
| 20 | ∞ | 0.37 | | |
| Image plane(Light receiving surface) | ∞ | | | |

Aspherical surface data

3rd surface k = 0.000, A4 = 1.98648e−05, A6 = −2.06809e−08

4th surface k = 0.000, A4 = 1.19346e−03, A6 = −4.90496e−05, A8 = 9.82160e−07, A10 = −8.23181e−09

5th surface k = 0.000, A4 = 1.22557e−03, A6 = 3.60513e−05, A8 = −2.55133e−06, A10 = −1.82267e−08

8th surface k = 0.000, A4 = −5.35762e−04, A6 = −1.58676e−05, A8 = 4.60963e−07, A10 = −4.90426e−09

10th surface k = 0.000, A4 = −1.28368e−03, A6 = −2.82048e−05, A8 = −3.78597e−06, A10 = −7.30725e−08

11th surface k = 0.000, A4 = 9.33519e−04, A6 = −6.37821e−05, A8 = 2.56978e−06, A10 = −2.74414e−08

13th surface k = 0.000, A4 = −2.32547e−05, A6 = 8.05407e−05

17th surface k = 0.009, A4 = −4.23673e−07, A6 = 4.42225e−09

Zoom data

| | WE | ST1 | ST2 | ST3 | TE |
|---|---|---|---|---|---|
| f(mm) | 5.10 | 7.89 | 17.01 | 26.01 | 49.10 |
| Fno. | 3.38 | 3.69 | 5.10 | 5.51 | 6.00 |
| 2ω(°) | 81.73 | 52.18 | 25.55 | 16.87 | 8.93 |
| d3 | 0.30 | 4.45 | 9.47 | 13.73 | 18.10 |
| d8 | 11.25 | 7.78 | 4.56 | 3.69 | 1.34 |
| d13 | 3.42 | 4.11 | 13.82 | 16.40 | 18.37 |
| d16 | 6.14 | 7.22 | 7.00 | 5.70 | 3.07 |

-continued

Unit mm

Distance from surface closest to the object, of each lens unit to image plane

| Focal length | G1 | G2 | G3 | G4 |
|---|---|---|---|---|
| 5.1 | 37.36 | 32.41 | 16.09 | 9.51 |
| 7.89 | 39.80 | 30.70 | 17.85 | 10.59 |
| 11.01 | 43.79 | 35.13 | 24.56 | 10.98 |
| 14.01 | 48.05 | 36.23 | 26.22 | 10.75 |
| 17.01 | 51.09 | 36.96 | 27.34 | 10.37 |
| 20.01 | 53.19 | 37.25 | 27.90 | 9.88 |
| 23.01 | 54.66 | 37.27 | 28.12 | 9.31 |
| 26.01 | 55.75 | 37.38 | 28.62 | 9.07 |
| 29 | 56.40 | 37.03 | 28.43 | 8.46 |
| 32 | 56.61 | 36.29 | 27.81 | 7.76 |
| 34.97 | 56.69 | 35.65 | 27.45 | 7.36 |
| 37.99 | 56.23 | 34.35 | 26.42 | 6.93 |
| 40.99 | 56.09 | 33.74 | 26.31 | 6.87 |
| 44 | 56.03 | 33.35 | 26.42 | 6.84 |
| 46.99 | 56.05 | 33.11 | 26.66 | 6.78 |
| 49.1 | 57.12 | 34.37 | 27.96 | 6.44 |

EXAMPLE 3

Unit mm

Surface data

| Surface no. | r | d | nd | νd |
|---|---|---|---|---|
| 1 | 21.257 | 0.80 | 1.94595 | 17.98 |
| 2 | 18.209 | 3.85 | 1.49700 | 81.54 |
| 3* | −66.917 | Variable | | |
| 4* | −22.219 | 0.80 | 1.76802 | 49.24 |
| 5* | 5.481 | 1.89 | | |
| 6 | 74.445 | 1.60 | 1.94595 | 17.98 |
| 7 | −23.299 | 0.60 | 1.76802 | 49.24 |
| 8* | 215.699 | Variable | | |
| 9(S) | ∞ | 0.30 | | |
| 10* | 4.226 | 2.35 | 1.49700 | 81.54 |
| 11* | −16.223 | 0.10 | | |
| 12 | 5.044 | 0.70 | 2.00170 | 20.64 |
| 13* | 3.439 | Variable | | |
| 14 | −21.102 | 1.60 | 1.51825 | 64.14 |
| 15* | −8.879 | 0.00 | | |
| 16(FS) | ∞ | Variable | | |
| 17 | ∞ | 0.40 | 1.51633 | 64.14 |
| 18 | ∞ | 0.50 | | |
| 19 | ∞ | 0.50 | 1.51633 | 64.14 |
| 20 | ∞ | 0.37 | | |
| Image plane(Light receiving surface) | ∞ | | | |

Aspherical surface data

3rd surface k = 0.000, A4 = 1.43757e−05, A6 = −1.36130e−08
4th surface k = 0.000, A4 = 1.21703e−03, A6 = −5.46492e−05, A8 = 1.04169e−06, A10 = −7.77129e−09
5th surface k = 0.000, A4 = 1.04613e−03, A6 = 3.25777e−05, A8 = −2.65926e−06, A10 = −1.84775e−08
8th surface k = 0.000, A4 = −4.17728e−04, A6 = −2.92962e−05, A8 = 4.40061e−07, A10 = −4.99489e−09

-continued

Unit mm

10th surface k = 0.000, A4 = −1.10207e−03, A6 = −2.77492e−05, A8 = −3.77816e−06, A10 = −7.30453e−08
11th surface k = 0.000, A4 = 9.87282e−04, A6 = −6.65232e−05, A8 = 2.56751e−06, A10 = −2.74580e−08
13th surface k = 0.000, A4 = −1.52619e−05, A6 = 8.16567e−05
15th surface k = −2.836

Zoom data

| | WE | ST1 | ST2 | ST3 | TE |
|---|---|---|---|---|---|
| f(mm) | 5.10 | 7.86 | 17.01 | 17.01 | 49.26 |
| Fno. | 3.35 | 3.79 | 5.23 | 5.23 | 5.00 |
| 2ω(°) | 81.14 | 49.90 | 24.07 | 24.07 | 8.45 |
| d3 | 0.30 | 4.74 | 9.73 | 9.73 | 22.08 |
| d8 | 13.26 | 9.88 | 5.41 | 5.41 | 1.46 |
| d13 | 4.26 | 6.23 | 13.75 | 13.75 | 13.69 |
| d16 | 5.89 | 6.11 | 5.45 | 5.45 | 3.47 |

Distance from surface closest to the object, of each lens unit to image plane

| Focal length | G1 | G2 | G3 | G4 |
|---|---|---|---|---|
| 5.1 | 40.08 | 35.13 | 16.67 | 9.26 |
| 7.86 | 43.32 | 33.92 | 18.85 | 9.48 |
| 10.99 | 46.66 | 34.07 | 20.92 | 9.26 |
| 14.14 | 48.49 | 35.40 | 23.95 | 8.98 |
| 17.01 | 50.70 | 36.31 | 25.72 | 8.82 |
| 20.01 | 53.06 | 35.50 | 25.16 | 8.65 |
| 22.99 | 54.56 | 35.35 | 25.45 | 8.49 |
| 25.99 | 55.60 | 34.54 | 24.96 | 8.39 |
| 28.99 | 56.32 | 34.08 | 24.89 | 8.27 |
| 31.99 | 56.83 | 33.63 | 24.83 | 8.15 |
| 34.98 | 57.02 | 32.88 | 24.53 | 8.28 |
| 37.99 | 57.33 | 32.62 | 24.61 | 7.90 |
| 41.01 | 57.32 | 31.94 | 24.33 | 7.77 |
| 44.01 | 57.17 | 31.17 | 23.96 | 7.64 |
| 47.01 | 56.88 | 30.31 | 23.52 | 7.51 |
| 49.26 | 57.04 | 30.32 | 23.67 | 6.84 |

Aberration diagrams of the zoom lenses according to the first to third embodiments in the state in which the zoom lenses are focused on an object point at infinity are shown in FIGS. 4A to 6C.

Figure 4A:
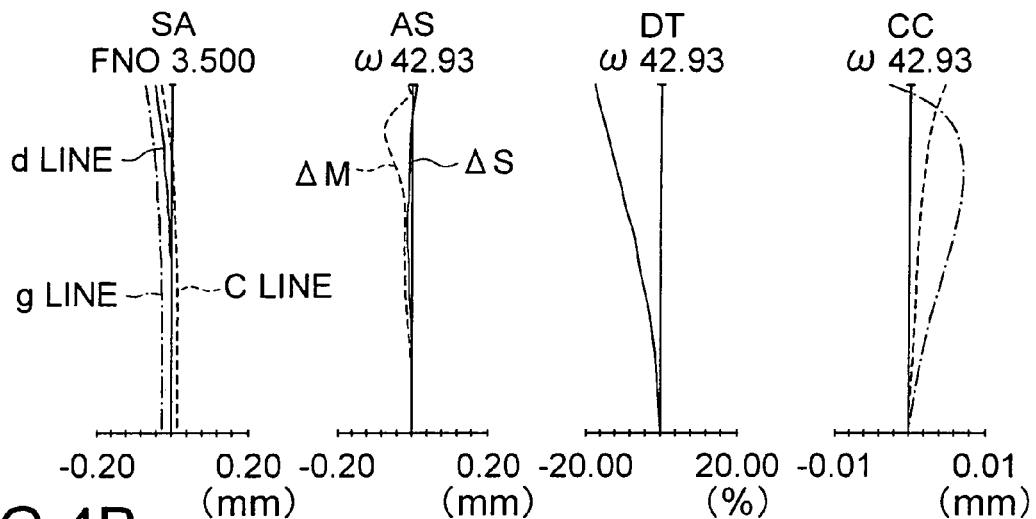
FIGS. 4A, 4B and 4C are diagrams showing spherical aberration, astigmatism, distortion and chromatic aberration of magnification in the first embodiment in the state in which the zoom lens is focused on an object point at infinity, where
Figure 5A:
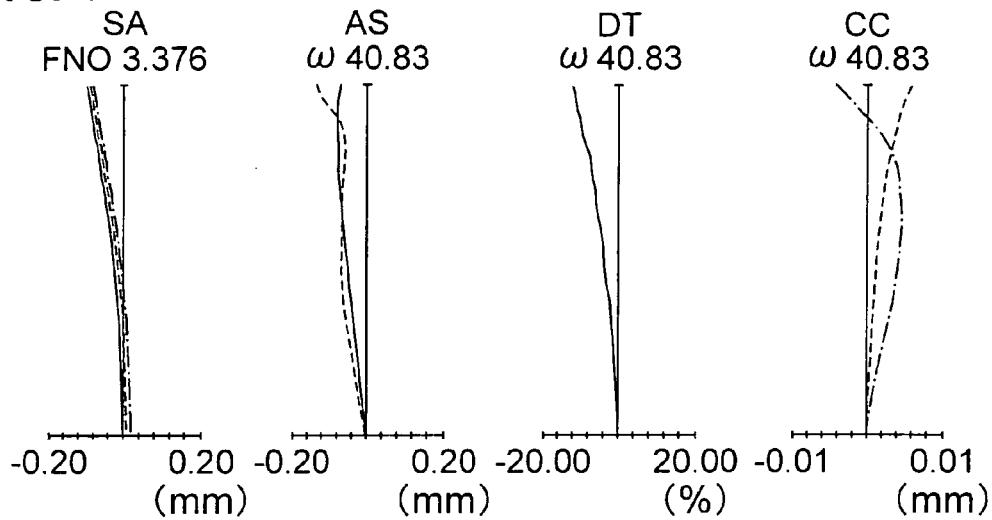
FIGS. 5A, 5B and 5C are diagrams similar to FIGS. 4A, 4B and 4C showing aberrations in the second embodiment in the state in which the zoom lens is focused at an object point at infinity.
Figure 6A:
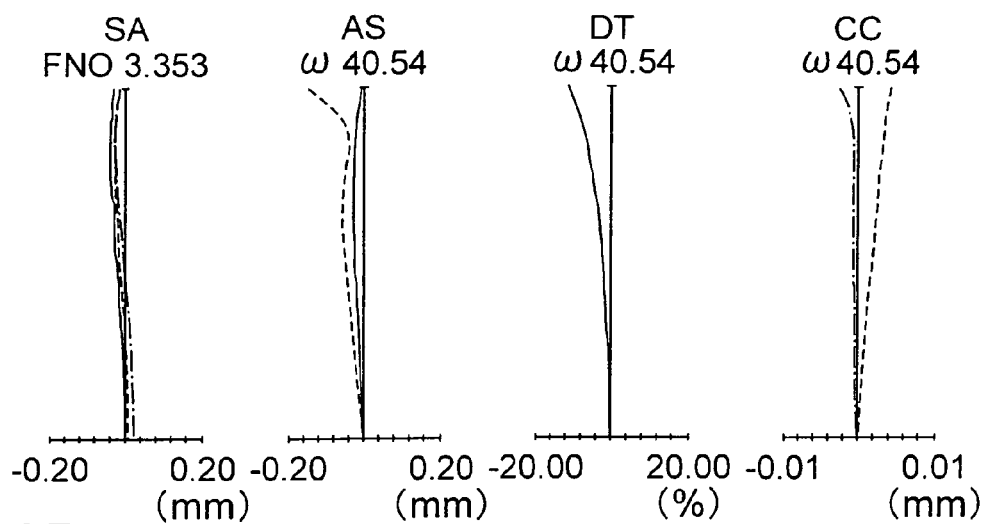
FIGS. 6A, 6B and 6C are diagrams similar to FIGS. 4A, 4B and 4C showing aberrations in the third embodiment in the state in which the zoom lens is focused at an object point at infinity.

FIGS. 4A, 5A and 6A show spherical aberration (SA), astigmatism (AS), distortion (DT) and chromatic aberration of magnification (CC) at the wide angle end.

Figure 4B:
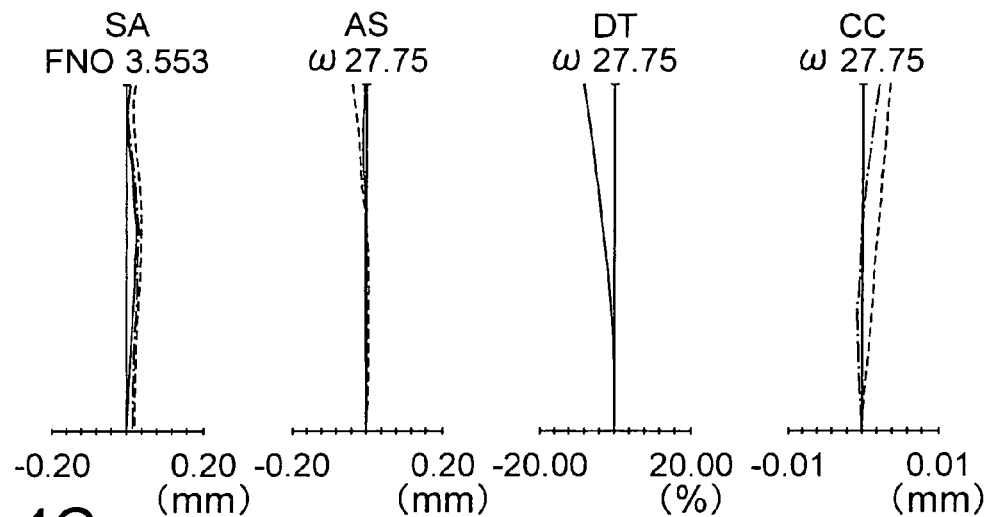
Figure 5B:
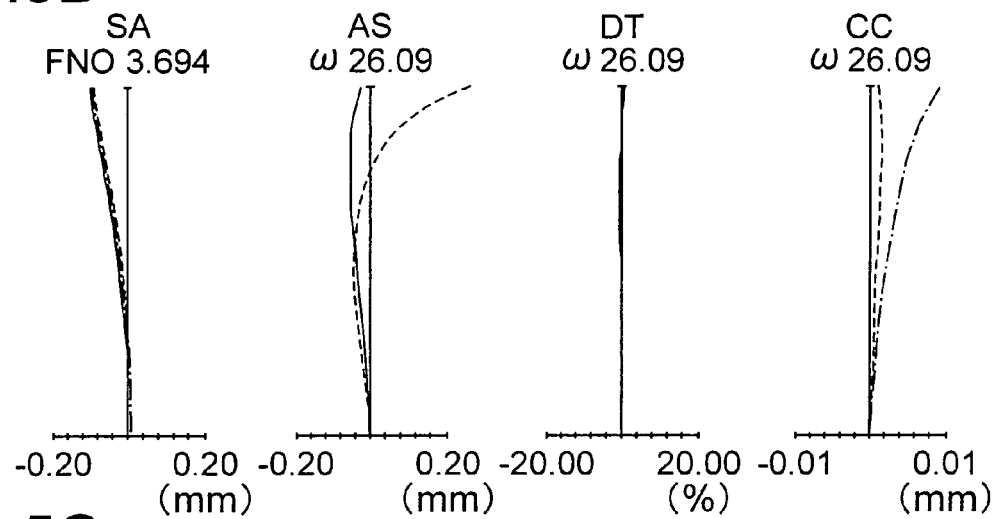
Figure 6B:
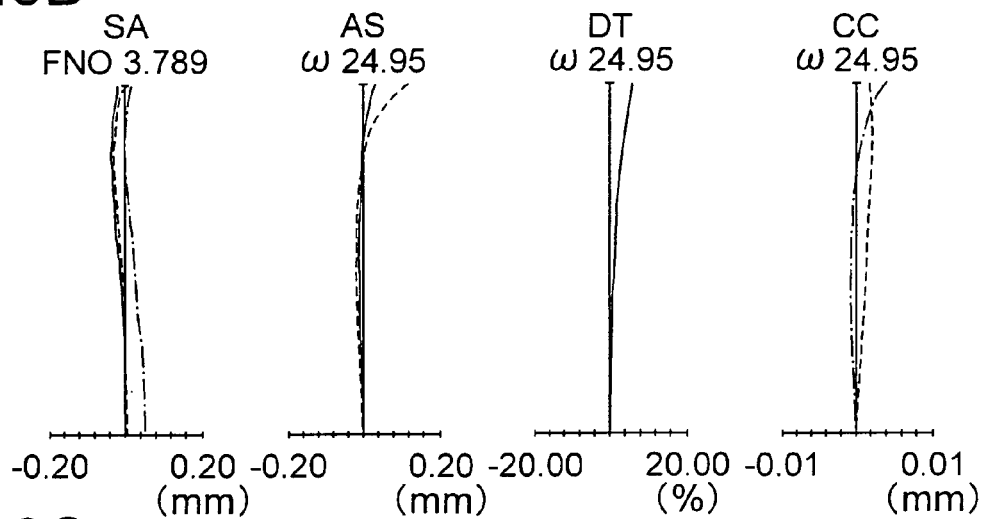

FIGS. 4B, 5B and 6B show spherical aberration (SA), astigmatism (AS), distortion (DT) and chromatic aberration of magnification (CC) in an intermediate state.

Figure 4C:
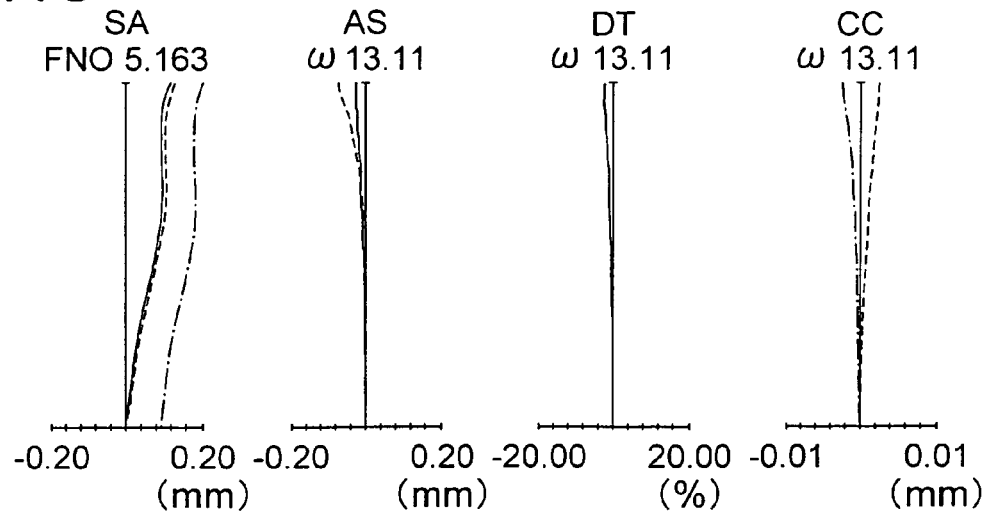
Figure 5C:
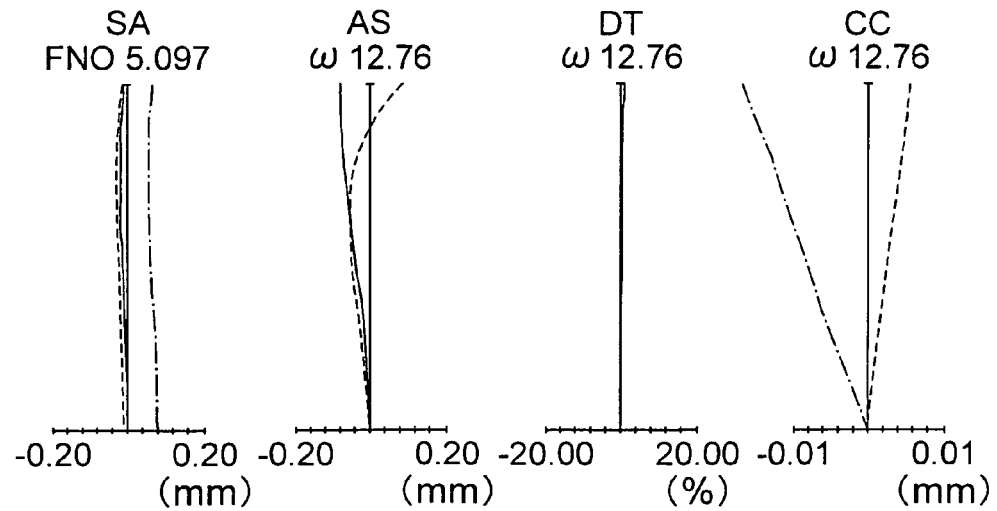
Figure 6C:
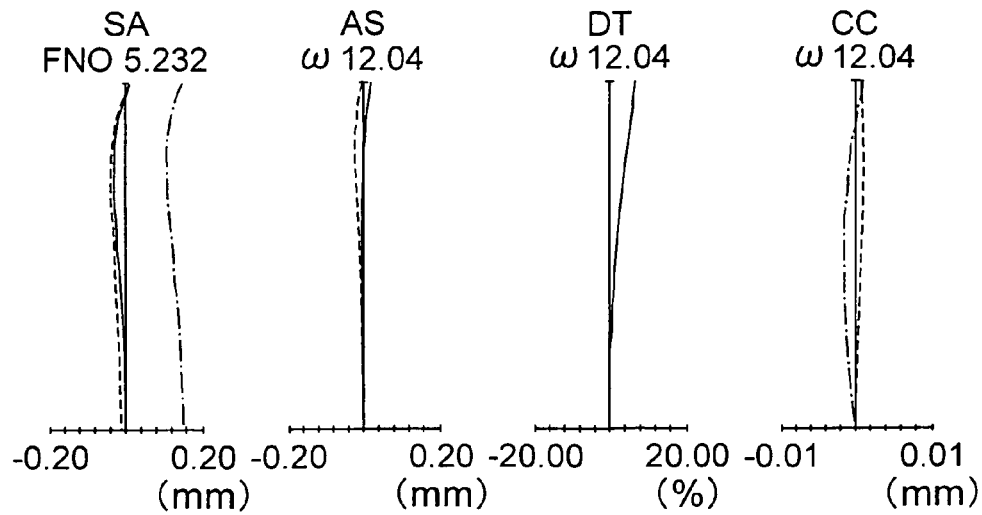

FIGS. 4C, 5C and 6C show spherical aberration (SA), astigmatism (AS), distortion (DT) and chromatic aberration of magnification (CC) at the telephoto end.

In the aberrations diagrams, the sign "ω" represents half the angle of field.

Values of conditional expressions of each of embodiments are shown below:

| | Example 1 | Example 2 | Example 3 |
|---|---|---|---|
| f1 | 39.46 | 32.54 | 36.74 |
| f2 | −7.77 | −6.30 | −6.49 |

-continued

|  | Example 1 | Example 2 | Example 3 |
|---|---|---|---|
| f3 | 10.79 | 10.73 | 10.09 |
| f4 | 16.57 | 17.32 | 28.20 |
| f5 | — | −1297.83 | — |
| zooming ratio | 9.59 | 9.62 | 9.66 |
| IH | 3.84 | 3.88 | 3.88 |
| BF (in air)WIDE | 6.01 | 1.26 | 7.38 |
| BF (in air)STND | 4.66 | 1.21 | 6.92 |
| BF (in air)TELE | 4.90 | 1.25 | 4.95 |
| Lens total length(in air)WIDE | 41.74 | 37.24 | 39.80 |
| Lens total length(in air)STND | 51.37 | 50.92 | 50.40 |
| Lens total length(in air)TELE | 64.22 | 57.00 | 56.76 |
| $S2_w$ | 37.43 | 32.41 | 35.13 |
| $S1_t$ | 64.52 | 57.12 | 57.04 |
| $S2_t$ | 41.17 | 34.37 | 30.32 |
| $S2_{m1}$ | 36.96 | 30.70 | 33.92 |
| $S2_{m2}$ | 46.22 | 37.38 | 36.31 |
| $S1w$ | 42.03 | 37.36 | 40.08 |
| $S1_{m2}$ | 64.27 | 55.75 | 50.70 |
| $f_{m1}$ | 7.97 | 7.89 | 7.86 |
| $f_{m2}$ | 35.01 | 26.01 | 17.01 |
| (1)$S2_w/S2_{m1}$ | 1.013 | 1.055 | 1.035 |
| (2)$S2_t/S2_{m2}$ | 0.891 | 0.920 | 0.835 |
| (3)$S1_t/f_t$ | 1.336 | 1.163 | 1.158 |
| (4)$f_t/f_w$ | 9.586 | 9.623 | 9.657 |
| (5)$(S1_{m2} - S1_w)/(S1_t - S1_w)$ | 0.989 | 0.931 | 0.626 |
| (6)$f_{m1}/f_w$ | 1.582 | 1.546 | 1.541 |
| (7)$f_{m2}/f_w$ | 6.949 | 5.097 | 3.335 |

(Correction of Distortion)

Incidentally, when the zoom lens system of the present invention is used, a digital correction of distortion of an image is carried out electrically. A basic concept for the digital correction of the distortion of an image will be described below.

Figure 10:
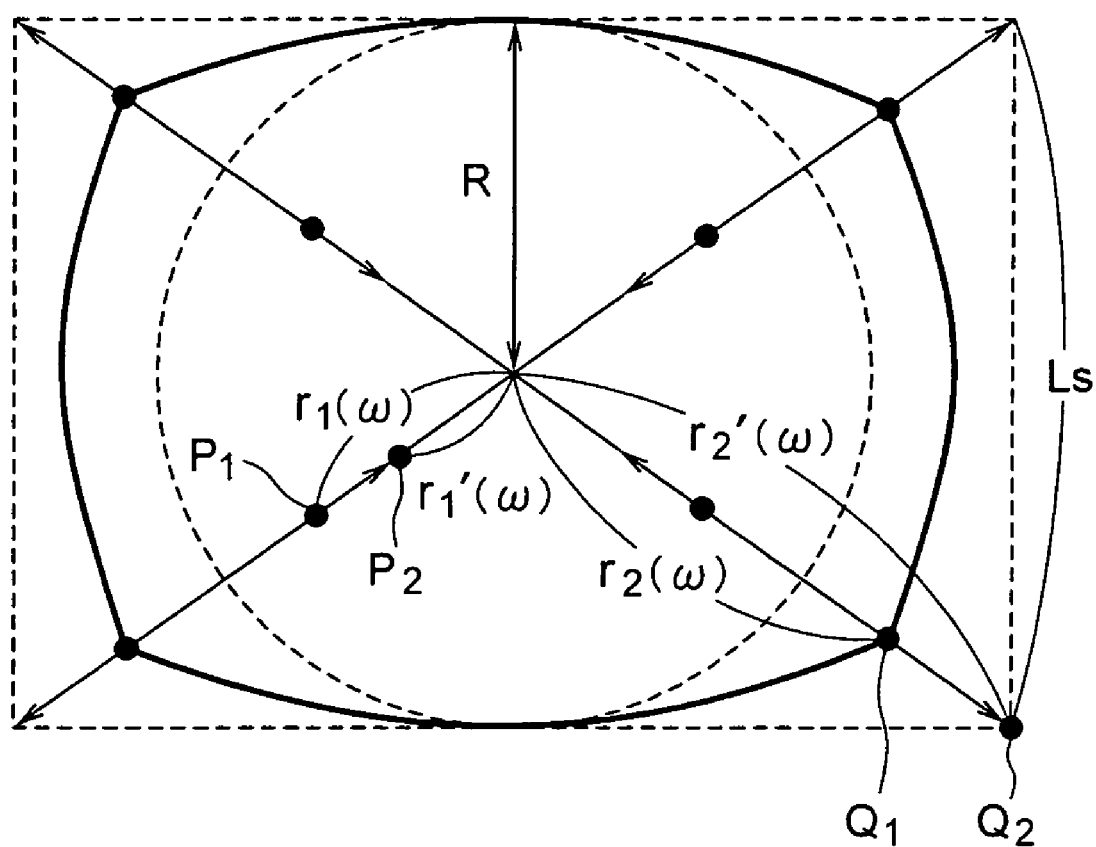
FIG. 10 is a diagram illustrating correction of distortion.

For example, as shown in FIG. 10, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius r(ω) other than the radius R is moved in a substantial direction of radiation, and the correction is carried out by moving on a concentric circle such that the radius becomes r'(ω).

For example, in FIG. 10, a point $P_1$ on a circumference of an arbitrary radius $r_1(ω)$ positioned at an inner side of a circle of radius R is moved to a point $P_2$ on a circumference of a radius $r_1'(ω)$ which is to be corrected, directed toward a center of the circle. Moreover, a point $Q_1$ on a circumference of an arbitrary radius $r_2(ω)$ positioned at an outer side of the circle of radius R is moved to a point $Q_2$ on a circumference of a radius $r_2'(ω)$ which is to be corrected, directed toward a direction away from the center of the circle.

Here, r'(ω) can be expressed as follows.

$$r'(ω) = α \cdot f \cdot \tan ω \quad (0 \leq α \leq 1)$$

where, ω is a half image angle of an object and f is a focal length of an imaging optical system (the zoom lens system in the present invention).

Here, when an ideal image height corresponding to a circle (image height) of radius R is let to be Y, then $$α = R/Y = R/(f \cdot \tan ω).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius r(ω) other than the radius R in a substantial direction of radiation, and moving on a concentric circle such that the radius becomes r'(ω), it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount r'(ω)−r(ω), an arrangement may be made such that a relationship between r(ω), in other words, half image angle and the image height, or a relationship between a real image height r and an ideal image height r'/α is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6 Ls$$

where, Ls is a length of a short side of the effective image pickup surface.

It is preferable that the radius R satisfies the following conditional expression.

$$0.3 Ls \leq R \leq 0.6 Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $r'(\omega) = \alpha \cdot f \tan \omega$ near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $r'(\omega) = \alpha \cdot f \tan \omega$ near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $f = y/\tan \omega$ holds.

Here, y denotes a height (image height) of an image point from the optical axis, f denotes a focal length of an imaging system (zoom lens system in the present invention), and $\omega$ denotes an angle (object half image angle) with respect to the optical axis in an object point direction corresponding to image points connecting from a center on an image pickup plane up to a position of y.

When there is a barrel-shape distortion in the imaging system, the relationship becomes $f > y/\tan \omega$.

In other words, when the focal length f of the imaging system, and the image height y are let to be fixed, a value of $\omega$ becomes large.

(Digital Camera)

Figure 11:
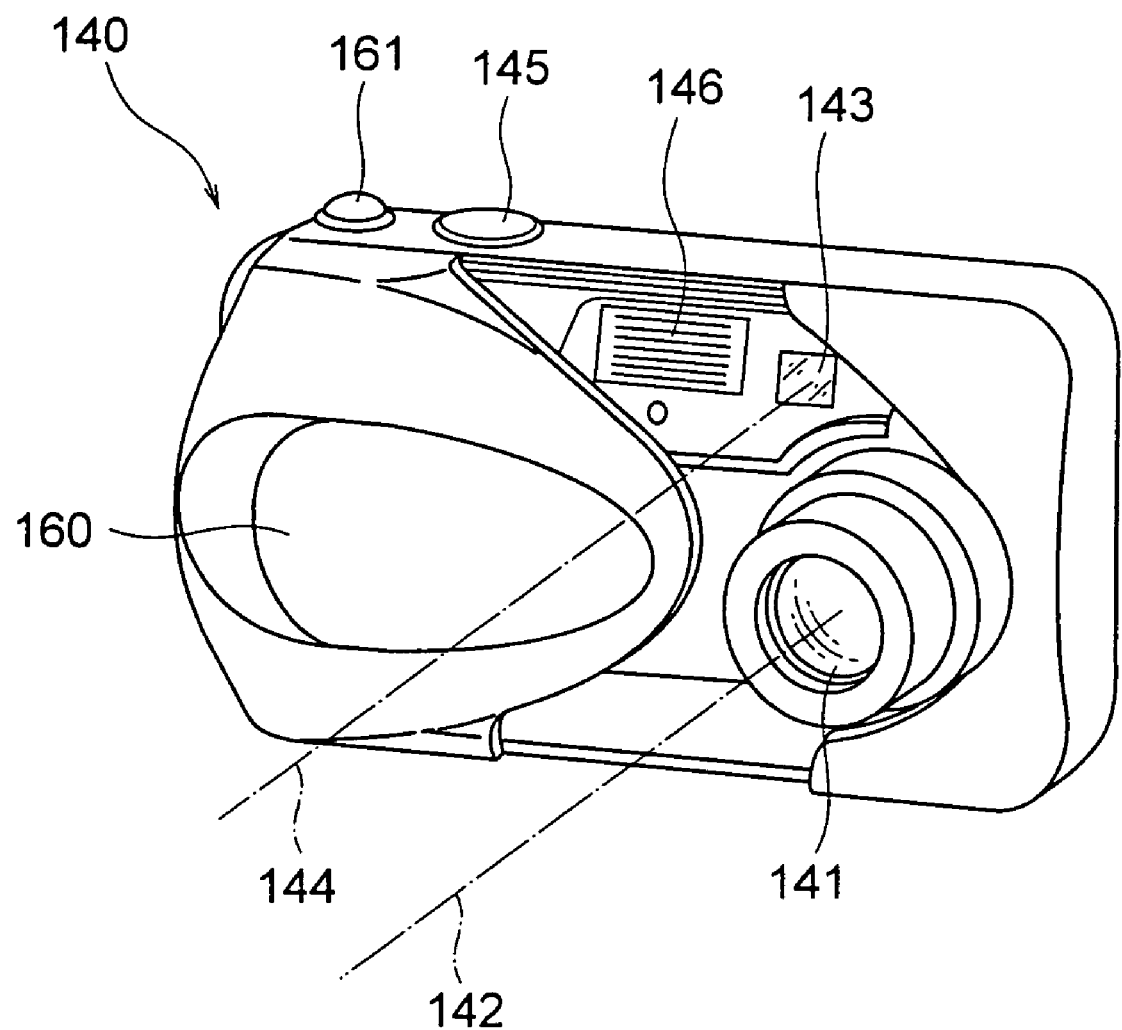
FIG. 11 is a front perspective view showing an outer appearance of a digital camera equipped with a zoom lens according to the present invention.
Figure 12:
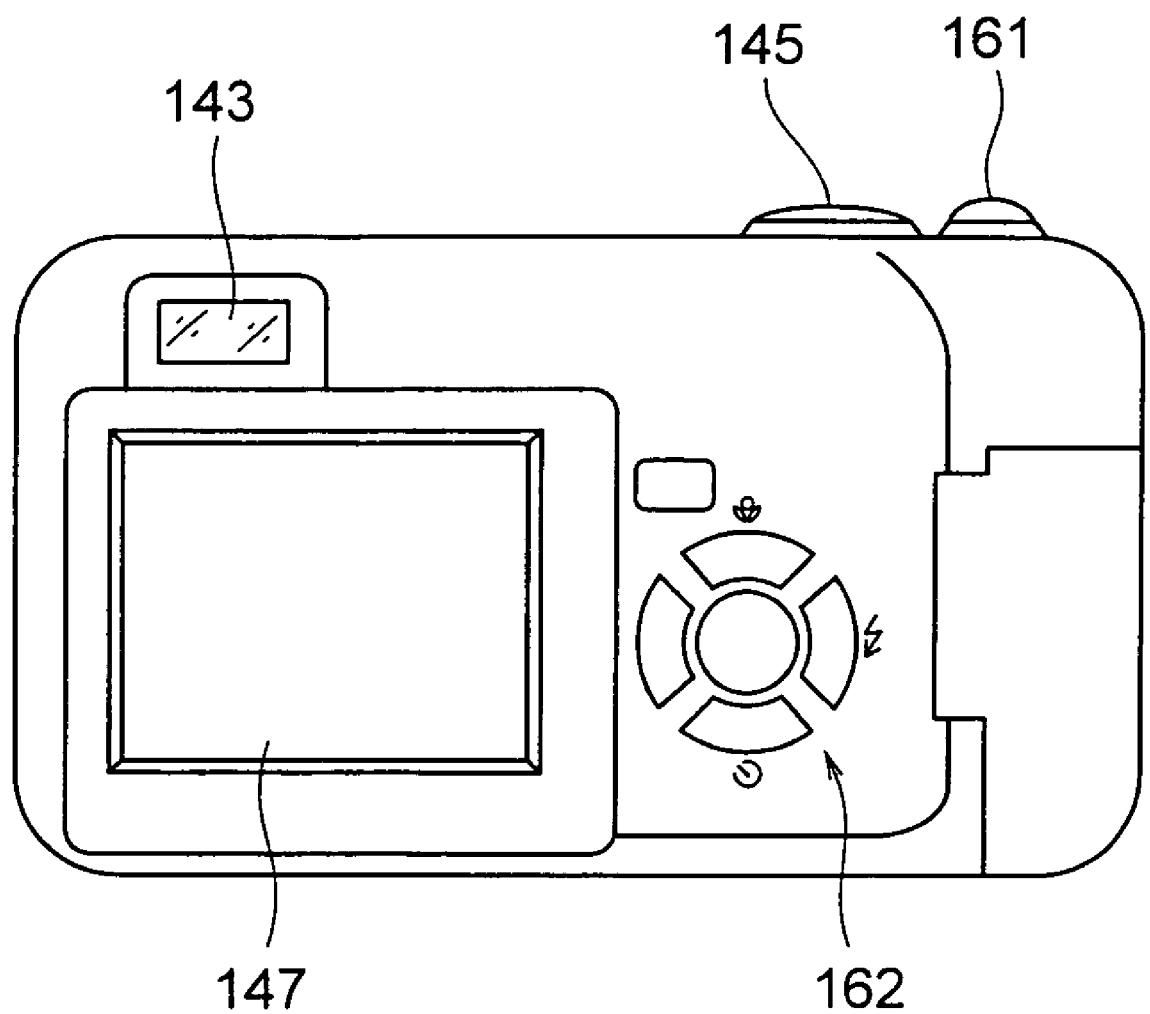
FIG. 12 is a rear perspective view of the digital camera.
Figure 13:
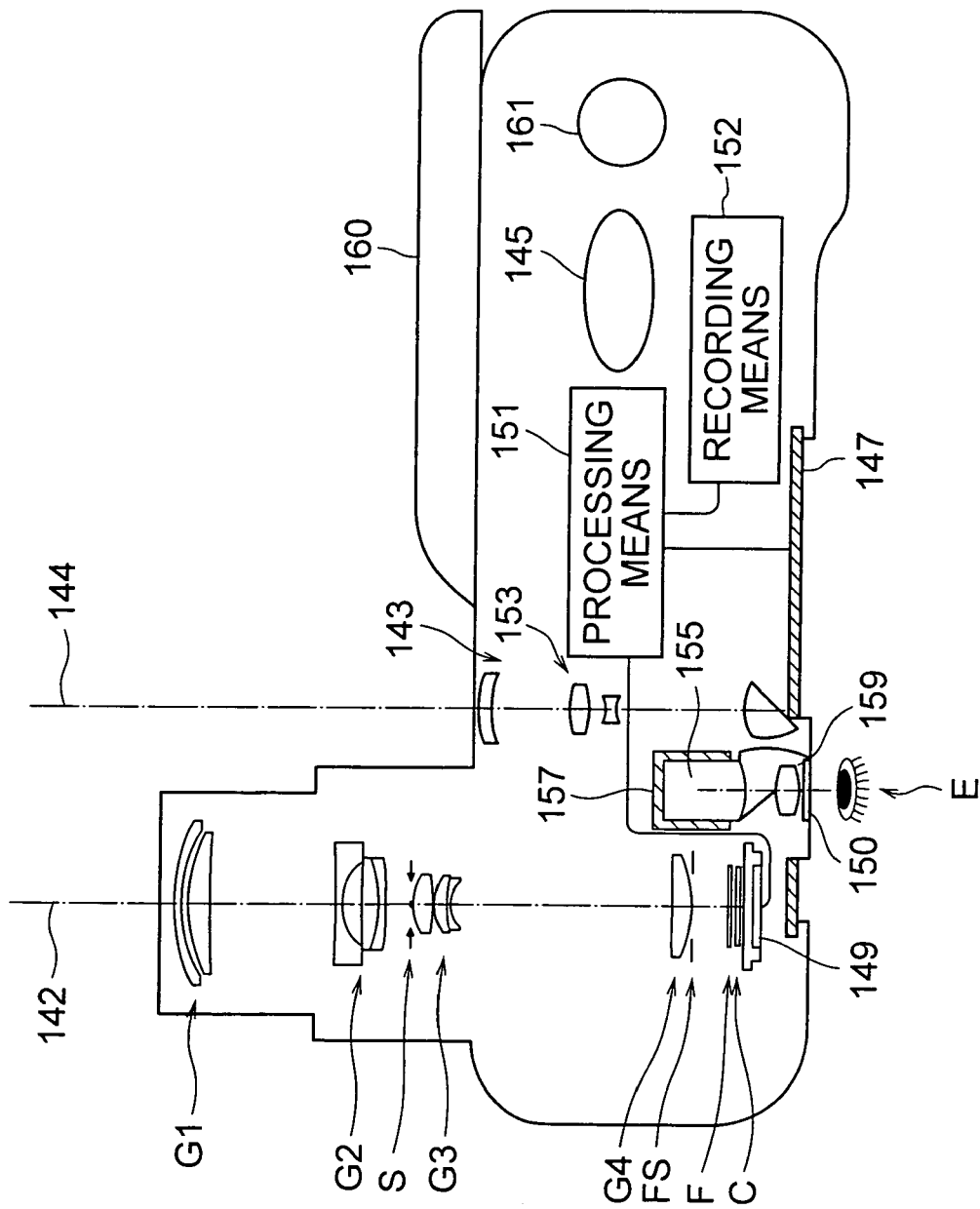
FIG. 13 is a cross sectional view of the digital camera.

FIG. 11 to FIG. 13 are conceptual diagrams of a structure of a digital camera according to the present invention in which a zoom lens system described above is incorporated in a taking optical system 141. FIG. 11 is a front perspective view showing an appearance of a digital camera 140, FIG. 12 is a rear perspective view of the same, and FIG. 13 is a schematic cross-sectional view showing a structure of the digital camera 140. In FIG. 11 and FIG. 13, show an uncollapsed state of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera is set in a photo taking state, the taking optical system 141 assumes the uncollapsed state as shown in FIG. 11, when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. The finder objective optical system 153 consists of a plurality of lens units (three units in the diagram), and two prisms, and is made of a zoom optical system in which a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has an extremely small thickness in collapsed state, and an extremely stable imaging performance in the entire zooming region at high magnification, it is possible to realize a high-performance, a small size, and a widening of angle.

(Internal Circuit Structure)

Figure 14:
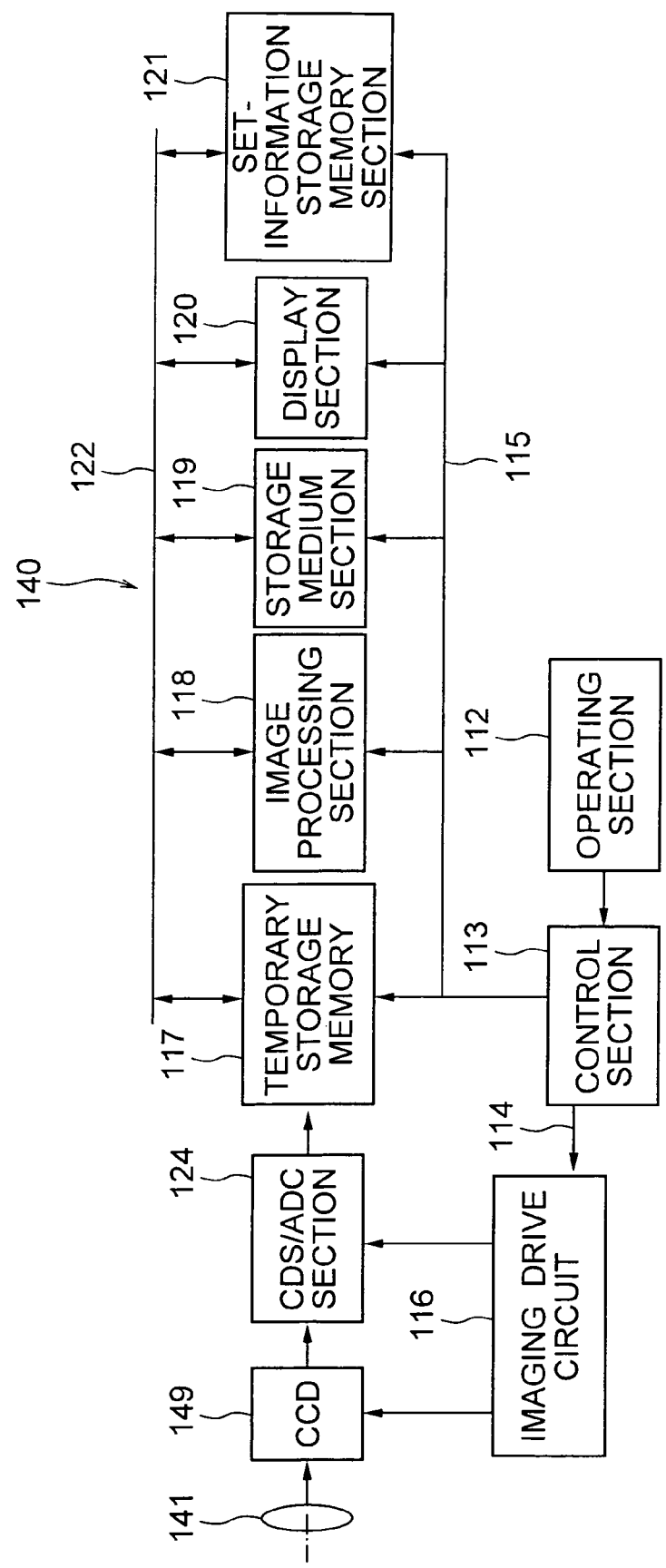
FIG. 14 is a block diagram of an internal circuit of a principal portion of the digital camera.

FIG. 14 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 14, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

As described above, the zoom lens according to the present invention is useful in providing a zoom lens in which a high zoom ratio can be readily achieved, the diametrical dimension thereof can be advantageously reduced, and variations in aberrations associated with an increase in the zoom ratio can be easily suppressed.

According to the invention, there can be provided a zoom lens that can be readily made small with respect to the diametrical direction and is advantageous in achieving a high zoom ratio. In addition, variations in aberrations associated with an increase in the zoom ratio can be easily prevented. There can also be provided an image pickup apparatus equipped with such a zoom lens.

What is claimed is:

1. A zoom lens comprising, in order from an object side thereof:

a first lens unit having a positive refracting power;

a second lens unit having a negative refracting power; and a rear group having a positive refracting power that comprises at least one lens unit, a lens unit located closest to the object side in the rear group being a third lens unit having a positive refracting power, wherein the zoom lens comprises an aperture stop disposed closer to an image side than the second lens unit and closer to the object side than a lens surface closest to the image side in the third lens unit, during zooming from a wide angle end to a telephoto end in a state in which the zoom lens is focused on an object at a farthest distance, a distance between the first lens unit and the second lens unit is larger at the telephoto end than at the wide angle end, a distance between the second lens unit and the third lens unit is smaller at the telephoto end than at the wide angle end, the first lens unit is located closer to the object side at the telephoto end than at the wide angle end, the second lens unit starts to move toward the object side at an intermediate point in zooming from the wide angle end to the telephoto end and thereafter reverses its moving direction to move toward the image side, the aperture stop is located closer to the object side at the telephoto end than at the wide angle end, the third lens unit is located closer to the object side at the telephoto end than at the wide angle end, and the zoom lens satisfies the following conditions:

$$1.0 \leq S2_w/S2_{m1} < 1.1$$

$$0.5 < S2_t/S2_{m2} < 0.99$$

$$1.0 < S1_t/f_t < 1.4$$

where, $f_t$ is a focal length of the entire zoom lens system at the telephoto end, $S1_t$ is an actual distance on the optical axis from a lens surface located closest to the object side in the first lens unit to an image plane at the telephoto end, $S2_w$ is an actual distance on the optical axis from a lens surface located closest to the object side in the second lens unit to the image plane at the wide angle end, $S2_t$ is an actual distance on the optical axis from the lens surface located closest to the object side in the second lens unit to the image plane at the telephoto end, $S2_{m1}$ is an actual distance on the optical axis from the lens surface located closest to the object side in the second lens unit to the image plane at a first intermediate zoom position, which is defined as a zoom position at which the second lens unit starts to move toward the object side, and $S2_{m2}$ is an actual distance on the optical axis from the lens surface located closest to the object side in the second lens unit to the image plane at a second intermediate zoom position, which is defined as a zoom position at which the second lens unit reverses its moving direction from movement toward the object side to movement toward the image side.

2. The zoom lens according to claim 1, wherein during zooming from the wide angle end to the telephoto end, the second lens unit moves first toward the image side.

3. The zoom lens according to claim 1, wherein the zoom lens satisfies the following condition:

$$8.0 < f_t/f_w < 25.0$$

where $f_t$ is the focal length of the entire zoom lens system at the telephoto end, and $f_w$ is the focal length of the entire zoom lens system at the wide angle end.

4. The zoom lens according to claim 1, wherein during zooming from the wide angle end to the telephoto end, the first lens unit moves first toward the object side.

5. The zoom lens according to claim 1, wherein the first lens unit moves in such a way that the following condition is satisfied:

$$0.5 < (S1_{m2} - S1_w)/(S1_t - S1_w) < 1.02$$

where $S1_w$ is an actual distance on the optical axis from a lens surface located closest to the object side in the first lens unit to the image plane at the wide angle end, $S1_{m2}$ is an actual distance on the optical axis from the lens surface located closest to the object side in the first lens unit to the image plane at the second intermediate zoom position, and $S1_t$ is an actual distance on the optical axis from the lens surface located closest to the object side in the first lens unit to the image plane at the telephoto end.

6. The zoom lens according to claim 1, wherein the second lens unit moves in such a way that the following condition is satisfied:

$$1.02 < f_{m1}/f_w < 2.0$$

$$5.0 < f_{m2}/f_w < 9.0$$

where $f_{m1}$ is the focal length of the entire zoom lens system at the first intermediate zoom position, $f_{m2}$ is the focal length of the entire zoom lens system at the second intermediate zoom position, and $f_w$ is the focal length of the entire zoom lens system at the wide angle end.

7. The zoom lens according to claim 1, wherein the rear group comprises a fourth lens unit having a positive refracting power disposed on the image side of the third lens unit, and
during zooming from the wide angle end to the telephoto end, the fourth lens unit moves in such a way that a distance between it and the third lens unit changes, and the fourth lens unit is located closer to the image side at the telephoto end than at the wide angle end.

8. The zoom lens according to claim 7, wherein the rear group comprises a fifth lens unit that is disposed on the image side of the fourth lens unit and fixed during zooming from the wide angle end to the telephoto end.

9. The zoom lens according to claim 8, wherein the fifth lens unit comprises an aspheric lens having an aspheric surface, and the total number of lenses included in the fifth lens unit is one.

10. An image pickup apparatus comprising:
a zoom lens according to claim 1; and
an image pickup element disposed on the image side of the zoom lens that converts an image formed by the zoom lens into an electrical signal.

11. The image pickup apparatus according to claim 10, further comprising an image processing section that performs signal processing that corrects aberration contained in an image represented by the electrical signal.

* * * * *